US012481051B2

(12) United States Patent
Wang et al.

(10) Patent No.: US 12,481,051 B2
(45) Date of Patent: Nov. 25, 2025

(54) TECHNIQUES FOR ENABLING BACKSCATTER-BASED POSITIONING MEASUREMENTS

(71) Applicant: QUALCOMM Incorporated, San Diego, CA (US)

(72) Inventors: Xiaojie Wang, Hillsborough, NJ (US); Jing Sun, San Diego, CA (US); Xiaoxia Zhang, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 396 days.

(21) Appl. No.: 18/162,105

(22) Filed: Jan. 31, 2023

(65) Prior Publication Data

US 2024/0255634 A1 Aug. 1, 2024

(51) Int. Cl.
*G01S 13/00* (2006.01)
*G01S 13/75* (2006.01)
*G01S 13/82* (2006.01)

(52) U.S. Cl.
CPC ............ *G01S 13/75* (2013.01); *G01S 13/825* (2013.01)

(58) Field of Classification Search
CPC ............................... G01S 13/75; G01S 13/825
See application file for complete search history.

(56) References Cited

U.S. PATENT DOCUMENTS

| 2024/0163840 | A1* | 5/2024 | Säily | H04L 25/0222 |
| 2024/0259090 | A1* | 8/2024 | Wang | H04B 7/22 |
| 2024/0405863 | A1* | 12/2024 | Cui | H02J 50/001 |

FOREIGN PATENT DOCUMENTS

| WO | WO-2021197218 A1 * | 10/2021 | |
| WO | WO-2022096807 A1 * | 5/2022 | G01S 13/876 |
| WO | WO-2022200673 A1 | 9/2022 | |
| WO | WO-2024152188 A1 * | 7/2024 | H04W 64/00 |

OTHER PUBLICATIONS

International Search Report and Written Opinion—PCT/US2024/010288—ISA/EPO—May 13, 2024.

* cited by examiner

*Primary Examiner* — Khai M Nguyen
(74) *Attorney, Agent, or Firm* — Dalei Dong; Holland & Hart LLP

(57) ABSTRACT

Methods, systems, and devices for wireless communications are described. In some wireless communications systems, a first wireless device, such as an energy harvesting device, may receive, from a second wireless device, such as an energy transmitting device, parameters associated with backscattering a positioning signal, the parameters including an identifier associated with the first wireless device and an indication of a time offset associated with transmission of a backscattered positioning signal. The first wireless device may receive the positioning signal based on the identifier and transmit the backscattered positioning signal based on applying a backscattering function to the positioning signal in accordance with the offset. The second wireless device may calculate a position of the first wireless device based on a time of reception of the backscattered positioning signal and the time offset.

28 Claims, 18 Drawing Sheets

TECHNIQUES FOR ENABLING BACKSCATTER-BASED POSITIONING MEASUREMENTS

FIELD OF DISCLOSURE

The following relates to wireless communications, including techniques for enabling backscatter-based positioning measurements.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communication systems, wireless devices may communicate with one another via energy harvesting and backscatter communication. A wireless device may harvest energy from received signals and may use the harvested energy to perform backscattered transmissions.

SUMMARY

The described techniques relate to improved methods, systems, devices, and apparatuses that support techniques for enabling backscatter-based positioning measurements. Generally, the techniques described herein may enable an energy transfer device to transmit an initial signal indicating a time offset associated with an energy harvesting device backscattering a positioning signal, such that the energy transfer device may calculate a position of the energy harvesting wireless device based on the offset. For example, the energy transfer device may transmit, to the energy harvesting device, parameters associated with backscattering a positioning signal, the parameters including an identifier associated with the energy harvesting device and an indication of a time offset associated with transmission of a backscattered positioning signal. The energy harvesting device may receive the positioning signal and may transmit the backscattered positioning signal based on applying a backscattering function to the positioning signal in accordance with the time offset. As such, the energy transfer device may receive the backscattered positioning signal and calculate a position of the energy harvesting device based on the time offset and a time of reception of the backscattered positioning signal.

A method for wireless communications at a wireless device is described. The method may include receiving parameters associated with backscattering a positioning signal, the parameters including an identifier associated with the wireless device and an indication of a time offset associated with transmission of a backscattered positioning signal, receiving the positioning signal based on the identifier, and transmitting the backscattered positioning signal based on applying a backscattering function to the positioning signal in accordance with the time offset.

An apparatus for wireless communications at a wireless device is described. The apparatus may include a processor, memory coupled with the processor, and instructions stored in the memory. The instructions may be executable by the processor to cause the apparatus to receive parameters associated with backscattering a positioning signal, the parameters including an identifier associated with the wireless device and an indication of a time offset associated with transmission of a backscattered positioning signal, receive the positioning signal based on the identifier, and transmit the backscattered positioning signal based on applying a backscattering function to the positioning signal in accordance with the time offset.

Another apparatus for wireless communications at a wireless device is described. The apparatus may include means for receiving parameters associated with backscattering a positioning signal, the parameters including an identifier associated with the wireless device and an indication of a time offset associated with transmission of a backscattered positioning signal, means for receiving the positioning signal based on the identifier, and means for transmitting the backscattered positioning signal based on applying a backscattering function to the positioning signal in accordance with the time offset.

A non-transitory computer-readable medium storing code for wireless communications at a wireless device is described. The code may include instructions executable by a processor to receive parameters associated with backscattering a positioning signal, the parameters including an identifier associated with the wireless device and an indication of a time offset associated with transmission of a backscattered positioning signal, receive the positioning signal based on the identifier, and transmit the backscattered positioning signal based on applying a backscattering function to the positioning signal in accordance with the time offset.

Some examples of the method, apparatuses, and non-transitory computer-readable medium described herein may further include operations, features, means, or instructions for initiating a timer following receipt of a reference symbol, where transmission of the backscattered positioning signal may be based on expiration of the timer, and where a duration of the timer may be based on the time offset.

In some examples of the method, apparatuses, and non-transitory computer-readable medium described herein, the reference symbol may be a last symbol of an initial signal including the parameters or may be based on a type of the time offset.

In some examples of the method, apparatuses, and non-transitory computer-readable medium described herein, the parameters indicates a first type of time offset from a set of multiple types of time offsets and the method, apparatuses, and non-transitory computer-readable medium may include further operations, features, means, or instructions for receiving a control signal indicating the set of multiple types of time offsets, where each type of time offset of the set of multiple types of time offsets may be associated with a duration of the timer, a reference symbol, or both, and where the time offset may be based on the indication of the first type of time offset.

In some examples of the method, apparatuses, and non-transitory computer-readable medium described herein, the duration of the timer, the first type of time offset, or both, may be based on a capability of the wireless device.

In some examples of the method, apparatuses, and non-transitory computer-readable medium described herein, the set of multiple wireless devices includes the wireless device.

In some examples of the method, apparatuses, and non-transitory computer-readable medium described herein, the parameters include an indication of a type of the backscattering function and the method, apparatuses, and non-transitory computer-readable medium may include further operations, features, means, or instructions for calculating the time offset based on a first set of backscattering parameters and a backscatter duration, where the first set of backscattering parameters may be based on the type of the backscattering function.

Some examples of the method, apparatuses, and non-transitory computer-readable medium described herein may further include operations, features, means, or instructions for receiving a control signal indicating a set of multiple sets of backscattering parameters associated with calculating the time offset, where each set of backscattering parameters may be associated with a type of backscattering function, and where the set of multiple sets of backscattering parameters includes the first set of backscattering parameters.

In some examples of the method, apparatuses, and non-transitory computer-readable medium described herein, the first set of backscattering parameters may be based on the identifier associated with the wireless device.

In some examples of the method, apparatuses, and non-transitory computer-readable medium described herein, the parameters indicate an energy threshold and the method, apparatuses, and non-transitory computer-readable medium may include further operations, features, means, or instructions for transmitting an acknowledgment message indicating initiation of a positioning session based on the wireless device satisfying the energy threshold and initiating a timer as part of the positioning session following transmission of the acknowledgment message, where transmission of the backscattered positioning signal may be based on expiration of the timer, and where a duration of the timer may be based on the time offset.

Some examples of the method, apparatuses, and non-transitory computer-readable medium described herein may further include operations, features, means, or instructions for receiving an energy signal based on reception of an initial signal including the parameters and harvesting energy from the energy signal, where the wireless device satisfy the energy threshold may be based on harvesting energy from the energy signal.

In some examples of the method, apparatuses, and non-transitory computer-readable medium described herein, the energy signal may be a CW signal.

In some examples of the method, apparatuses, and non-transitory computer-readable medium described herein, the energy threshold may be based on an energy level of the wireless device, a power level of the wireless device, a voltage level of the wireless device, or any combination thereof.

In some examples of the method, apparatuses, and non-transitory computer-readable medium described herein, an initial signal including the parameters further includes an energy signal based on the wireless device being an energy harvesting device.

In some examples of the method, apparatuses, and non-transitory computer-readable medium described herein, the parameters include an indication of a duration between reception of the parameters and reception of the positioning signal, a frequency shift associated with the backscattered positioning signal, a phase shift sequence associated with the backscattered positioning signal, the backscattering function, a type of the backscattering function, a backscatter duration, an energy threshold, or any combination thereof.

A method for wireless communications at a first wireless device is described. The method may include communicating parameters associated with a second wireless device backscattering a positioning signal, the parameters including an identifier associated with the second wireless device and an indication of a time offset associated with transmission of a backscattered positioning signal, receiving, from the second wireless device, the backscattered positioning signal, and calculating a position of the second wireless device based on the time offset and a time of reception of the backscattered positioning signal.

An apparatus for wireless communications at a first wireless device is described. The apparatus may include a processor, memory coupled with the processor, and instructions stored in the memory. The instructions may be executable by the processor to cause the apparatus to communicate parameters associated with a second wireless device backscattering a positioning signal, the parameters including an identifier associated with the second wireless device and an indication of a time offset associated with transmission of a backscattered positioning signal, receive, from the second wireless device, the backscattered positioning signal, and calculate a position of the second wireless device based on the time offset and a time of reception of the backscattered positioning signal.

Another apparatus for wireless communications at a first wireless device is described. The apparatus may include means for communicating parameters associated with a second wireless device backscattering a positioning signal, the parameters including an identifier associated with the second wireless device and an indication of a time offset associated with transmission of a backscattered positioning signal, means for receiving, from the second wireless device, the backscattered positioning signal, and means for calculating a position of the second wireless device based on the time offset and a time of reception of the backscattered positioning signal.

A non-transitory computer-readable medium storing code for wireless communications at a first wireless device is described. The code may include instructions executable by a processor to communicate parameters associated with a second wireless device backscattering a positioning signal, the parameters including an identifier associated with the second wireless device and an indication of a time offset associated with transmission of a backscattered positioning signal, receive, from the second wireless device, the backscattered positioning signal, and calculate a position of the second wireless device based on the time offset and a time of reception of the backscattered positioning signal.

In some examples of the method, apparatuses, and non-transitory computer-readable medium described herein, the parameters indicates a first type of time offset from a set of multiple types of time offsets and the method, apparatuses, and non-transitory computer-readable medium may include further operations, features, means, or instructions for transmitting a control signal indicating the set of multiple types of time offsets, where each type of time offset of the set of multiple types of time offsets may be associated with a duration of a timer, a reference symbol, or both, and where the time offset may be based on the indication of the first type of time offset.

In some examples of the method, apparatuses, and non-transitory computer-readable medium described herein, the parameters indicate a set of multiple time offsets associated with a set of multiple wireless devices, the set of multiple time offsets includes the time offset, and the set of multiple wireless devices includes the second wireless device.

In some examples of the method, apparatuses, and non-transitory computer-readable medium described herein, the parameters include an indication of a first type of backscattering function associated with a first set of backscattering parameters to be applied by the second wireless device and the method, apparatuses, and non-transitory computer-readable medium may include further operations, features, means, or instructions for transmitting a control signal indicating a set of multiple sets of backscattering parameters associated with the second wireless device calculating the time offset, where each set of backscattering parameters may be associated with a type of backscattering function, and where the time offset may be based on the first set of backscattering parameters from the set of multiple sets of backscattering parameters.

In some examples of the method, apparatuses, and non-transitory computer-readable medium described herein, the first set of backscattering parameters may be based on the identifier associated with the second wireless device.

In some examples of the method, apparatuses, and non-transitory computer-readable medium described herein, the parameters indicate an energy threshold and the method, apparatuses, and non-transitory computer-readable medium may include further operations, features, means, or instructions for receiving an acknowledgment message indicating initiation of a positioning session based on the second wireless device satisfying the energy threshold, where receipt of the backscattered positioning signal may be based on the acknowledgment message.

Some examples of the method, apparatuses, and non-transitory computer-readable medium described herein may further include operations, features, means, or instructions for transmitting an energy signal based on transmission of an initial signal including the parameters, where satisfaction of the energy threshold may be based on transmission of the energy signal.

In some examples of the method, apparatuses, and non-transitory computer-readable medium described herein, the energy signal may be a CW signal.

In some examples of the method, apparatuses, and non-transitory computer-readable medium described herein, the energy threshold may be based on an energy level of the second wireless device, a power level of the second wireless device, a voltage level of the second wireless device, or any combination thereof.

In some examples of the method, apparatuses, and non-transitory computer-readable medium described herein, an initial signal including the parameters further includes an energy signal based on the second wireless device being an energy harvesting device.

In some examples of the method, apparatuses, and non-transitory computer-readable medium described herein, the parameters include an indication of a duration between transmission of the parameters and transmission of the positioning signal, a frequency shift associated with the backscattered positioning signal, a phase shift sequence associated with the backscattered positioning signal, a backscattering function to be applied to the positioning signal, a type of the backscattering function, a backscatter duration, or any combination thereof.

In some examples of the method, apparatuses, and non-transitory computer-readable medium described herein, the parameters may be transmitted to the second wireless device and the method, apparatuses, and non-transitory computer-readable medium may include further operations, features, means, or instructions for transmitting, to the second wireless device, the positioning signal.

In some examples of the method, apparatuses, and non-transitory computer-readable medium described herein, the parameters may be received from a third wireless device and the method, apparatuses, and non-transitory computer-readable medium may include further operations, features, means, or instructions for transmitting, to the third wireless device, an indication of the position of the second wireless device.

DETAILED DESCRIPTION

Figure 1:
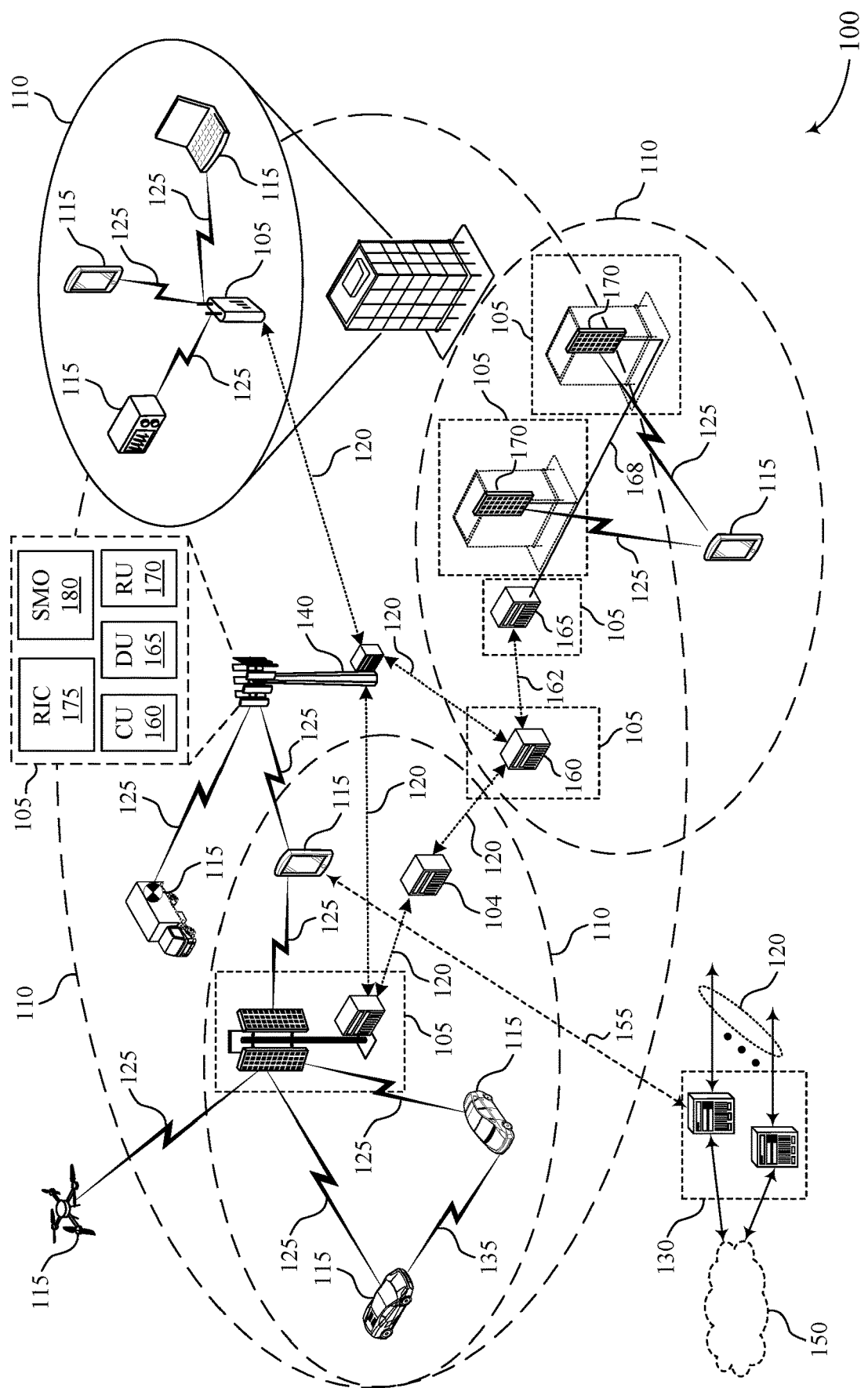
FIG. 1 illustrates an example of a wireless communications system that supports techniques for enabling backscatter-based positioning measurements in accordance with one or more aspects of the present disclosure.

In some wireless communication systems, a wireless device (e.g., a user equipment (UE) or a network node) may communicate with one or more low power devices or other devices that support energy harvesting (e.g., one or more radio frequency identification (RFID) tags or internet of things (IoT) devices, which may also be referred to as UEs, in some examples). To perform energy harvesting, a first wireless device, which may be referred to as an energy harvesting device, may harvest energy from the environment and signals, received from a second wireless device, which may be referred to as an energy transfer device, to perform transmissions. The transmissions by the energy harvesting device may be backscatter modulated. For example, the energy harvesting device may receive a signal, may apply a backscattering function to the received signal, and may transmit a backscattered signal using energy harvested from over the air. In some examples, the energy transfer device may determine a location of the energy harvesting device based on the backscattered signal. However, the energy transfer device may not know when the energy harvesting device will transmit the backscatter the signal. As a result, the energy harvesting device may monitor multiple different timing hypothesis to accurately receive the reflected signal, which may increase complexity and reduce reliability.

Accordingly, techniques, systems, and devices described herein may provide for an energy transfer device to determine a position of an energy harvesting device based on a time of reception of a backscattered positioning signal and a time offset indicated to the energy harvesting device. For example, the energy transfer device may transmit an initial message including parameters associated with backscattering a positioning signal. The parameters may include an identifier associated with the energy harvesting device, indicating the energy harvesting device is the intended recipient, and an indication of a time offset associated with a backscattered positioning signal, which may be referred to as a backscattered signal. In some examples, the indication of the time offset may be an explicit indication of the time offset (e.g., include the time offset). Additionally, or alternatively, the energy harvesting device may determine the time offset based on an indication of a time offset type, a type of backscatter function, a backscatter duration, an energy threshold, or any combination thereof. As such, the energy harvesting device may receive the positioning signal, apply a backscatter function to the positioning signal to generate the backscattered signal, and transmit the backscattered signal in accordance with the time offset. Additionally, the energy transfer device may determine a position of the energy harvesting device based on the time offset and a time of reception of the backscattered signal.

Aspects of the disclosure are initially described in the context of wireless communications systems. Aspects of the disclosure are then described in the context of timing diagrams and a process flow. Aspects of the disclosure are further illustrated by and described with reference to apparatus diagrams, system diagrams, and flowcharts that relate to techniques for enabling backscatter-based positioning measurements.

FIG. 1 illustrates an example of a wireless communications system 100 that supports techniques for enabling backscatter-based positioning measurements in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both.

For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for enabling backscatter-based positioning measurements as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions.

The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communication system 100 may support techniques for an energy transfer device, such as a network entity 105, to determine a position of an energy harvesting device, which may be referred to as a UE 115, based on a time of reception of a backscattered positioning signal and a time offset indicated to the energy harvesting device. For example, the network entity 105 may transmit an initial message including parameters associated with backscattering a positioning signal. The parameters may include an identifier associated with the UE 115, indicating the UE 115 is the intended recipient, and an indication of a time offset associated with a backscattered positioning signal, which may be referred to as a backscattered signal. In some examples, the indication of the time offset may be an explicit indication of the time offset (e.g., include the time offset). Additionally, or alternatively, the UE 115 may determine the time offset based on an indication of a type of time offset, a type of backscatter function, a backscatter duration, an energy threshold, or any combination thereof. As such, the UE 115 may receive the positioning signal, apply a backscatter function to the positioning signal to generate the backscattered signal, and transmit the backscattered signal in accordance with the time offset. Additionally, the network entity 105 may determine a position of the UE 115 based on the time offset and a time of reception of the backscattered signal.

Figure 2:
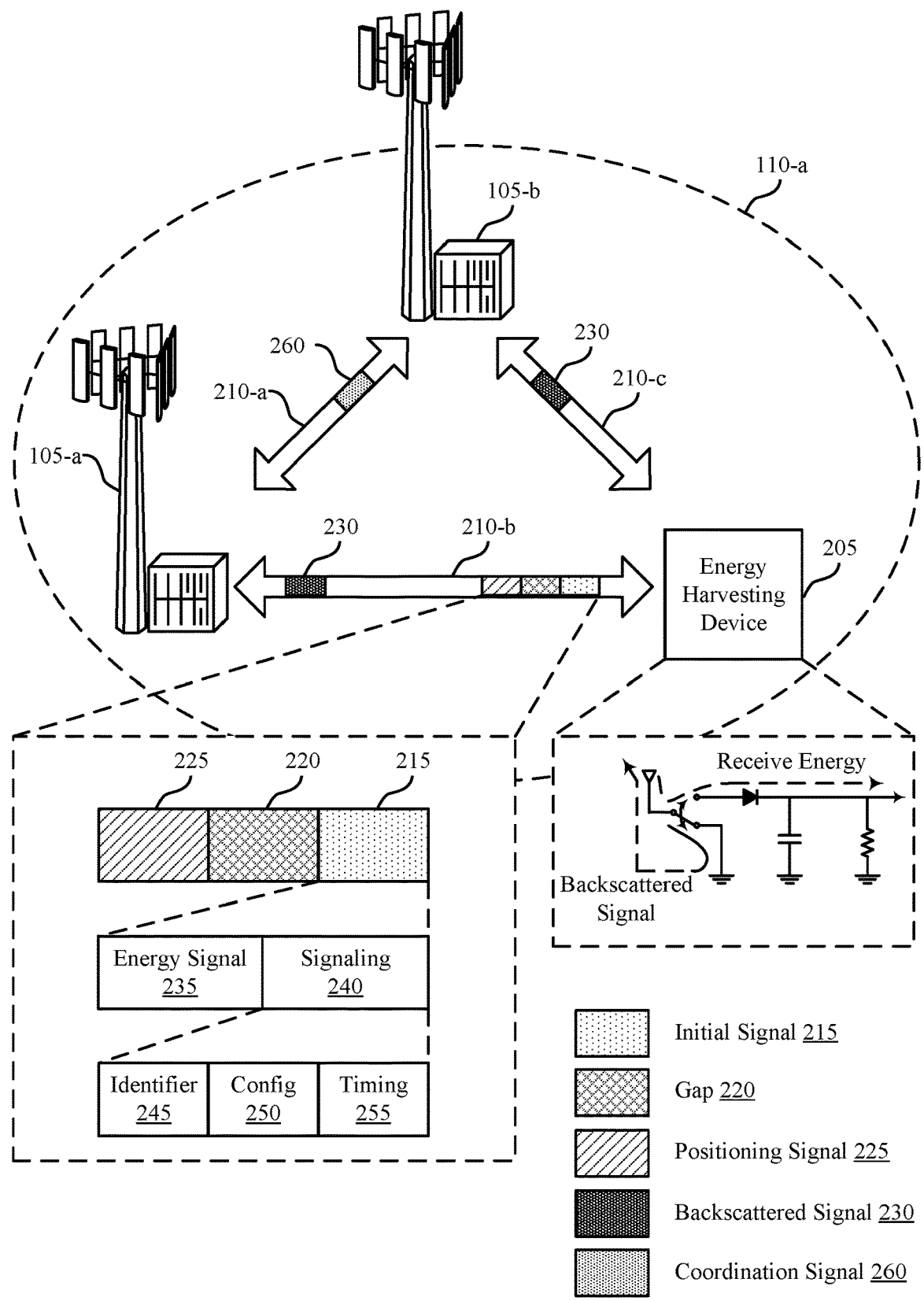
FIG. 2 illustrates an example of a wireless communications system that supports techniques for enabling backscatter-based positioning measurements in accordance with one or more aspects of the present disclosure.

FIG. 2 illustrates an example of a wireless communications system 200 that supports techniques for enabling backscatter-based positioning measurements in accordance with one or more aspects of the present disclosure. The wireless communications system 200 may implement or be implemented by aspects of the wireless communication system 100. For example, the wireless communications system 200 may include one or more network entities 105 (e.g., a network entity 105-a and a network entity 105-b) and one or more UEs 115, which may represent examples of corresponding devices as described with reference to FIG. 1. In some examples, the network entity 105-a may receive a backscattered signal 230 from an energy harvesting device 205 and calculate a position of the energy harvesting device 205 based on a time offset and a time of reception of the backscattered signal 230.

The energy harvesting device 205 may be a UE 115, a network entity 105, a RFID tag, an IoT device (e.g., a passive IoT (PIOT) device), or any other type of wireless device. As described with reference to FIG. 1, the energy harvesting device 205 may harvest energy from a received signal and may use the harvested energy to transmit or backscatter a signal. In some examples, the energy harvesting device 205 may harvest energy from the same signal that the energy harvesting device 205 backscatters. Additionally, or alternatively, the energy harvesting device 205 may harvest energy from a first signal, such as an initial signal 215, and may receive a second signal, such as a positioning signal 225, that the energy harvesting device 205 backscatters using the harvested energy (e.g., to generate a backscattered signal 230). The signal from which the energy harvesting device 205 harvests energy may be referred to as an energy transfer signal and may represent an example of a continuous waveform (CW) signal, a reference signal, or some other type of signal or message. The energy harvesting device 205 may receive a wireless signal from the network entity 105-a, the network entity 105-b, one or more other wireless devices, or any combination thereof. That is, the described techniques for energy harvesting and backscattering may be performed by any type of wireless device described herein. A device that transmits the wireless signal may be referred to as an energy transfer device, in some examples.

In some examples, the wireless devices of the wireless communications system 200 (e.g., the network entity 105-a, the network entity 105-b, and the energy harvesting device 205) may communicate with one another via energy harvesting and backscatter communication. The terms "forward communication" and "backscatter communication" may refer to a relative direction of communication between an energy transfer device (e.g., the network entity 105-a and the network entity 105-b) and an energy harvesting device 205. For example, in the context of backscatter communication, the network entity 105-a may transmit a signal or query to the energy harvesting device 205 via a forward link of a communication link 210-b, and the energy harvesting device 205 may transmit a backscattered signal 230 via a backscatter link of the communication link 210-b. The network entity 105-b may similarly support energy harvesting and backscatter communication with the energy harvesting device 205 via the communication link 210-c.

For the purposes of the present disclosure, the term "energy transfer device," and like terms, may be used interchangeably to refer to wireless devices that are configured to transmit commands or queries (e.g., wireless signals, energy transfer signals) to passive devices or other devices that are configured to perform energy harvesting, such as the energy harvesting device 205. Moreover, the term "energy transfer device," and like terms, may broadly be used to refer to wireless devices which transmit and/or receive signals from energy harvesting devices 205, and may therefore include "RF sources" and "Readers," or both. In this regard, energy transfer devices may include UEs 115, network entities 105, IAB nodes, and the like.

Additionally, a reader may include a transmitter and a receiver which may be co-located (e.g., traditional, monostatic) or may be located separately (e.g., bi-static). For example, in a co-located scenario, the network entity 105-*a* (e.g., a transmitter of a receiver at the network entity 105-*a*) may transmit one or more signals to the energy harvesting device 205 and the energy harvesting device 205 may reflect the one or more signals back to the network entity 105-*a* (e.g., a receiver of the reader at the network entity 105-*a*) as one or more backscattered signals 230. In such cases, self-interference may occur between one or more signals transmitted by the transmitter of the reader and one or more signals (e.g., backscattered signals 230) received by the receiver of the reader (e.g., isolation and processing gain may be used to reduce interference for backscattered signal 230 detection).

Alternatively, in a non-co-located scenario, the network entity 105-*a* (e.g., a transmitter of the reader at the network entity 105-*a*) may transmit one or more signals to the energy harvesting device 205 and the energy harvesting device 205 may reflect the one or more signals to the network entity 105-*b* (e.g., a receiver of the reader at the network entity 105-*b*) as one or more backscattered signals 230. Additionally, the network entity 105-*a* may communicate (e.g., transmit or receive) one or more coordination signals 260 with the network entity 105-*b* via the communication link 210-*a* to enable the network entity 105-*a*, the network entity 105-*b*, or both, to coordinate communications with the energy harvesting device 205.

As noted previously herein, in some implementations, an energy harvesting device may be a relatively low-complexity device which may or may not include a power amplifier and/or a battery. In some cases, an energy harvesting device 205 may include one or more antennas (e.g., dipole antennas) and other circuitry (e.g., integrated circuit, chip, load) used to facilitate wireless communications. In some aspects, the range over which an energy harvesting device 205 can transmit a message (e.g., a backscattered signal 230) may depend on the manner in which the respective energy harvesting device 205 is powered. For example, in some cases, an energy harvesting device 205 may not include a power source, but may instead receive power from wireless communications received from energy transfer devices and may transmit far-field signals or modulate reflected signals using power absorbed or extracted from signals received from energy transfer devices. In such cases, the range of such energy harvesting device 205 may be relatively small.

In some aspects, an energy harvesting device 205 may receive or generate power (e.g., radio frequency power harvesting) used for wireless communications and other operations using a rectifier, where a rectifier may include a diode and a capacitor. For example, an energy harvesting device 205 may receive a signal (e.g., power up signal) from an energy transfer device (e.g., the UE 115-*a* or the network entity 105-*a*) via an antenna, where power absorbed from the antenna is directed to a power rectifier. In this example, the power rectifier may convert absorbed power from the antenna to rectified power, which may be directed back to the antenna to transmit messages (e.g., transmit backscattered signals 230). The input power may be nonlinear at power headroom, in some examples, due to one or more diodes. In some examples, the input power absorbed from the antenna may be greater than a threshold power (e.g., −20 decibel milliwatts (dBm), or some other threshold) to turn on the power harvesting circuitry at the energy harvesting device 205 (e.g., due to a turn-on voltage of one or more diodes). The power harvesting may, in some examples, be more efficient at lower frequencies based on diode junction capacitance and resistance (e.g., frequency-selective conversion efficiency).

Additionally, an energy transfer device, such as the network entity 105-*a*, may transmit an identity signal (e.g., with additional control information) to the energy harvesting device 205 indicating that a wireless signal is to be transmitted to the energy harvesting device. After transmitting a wireless signal to the energy harvesting device 205, the network entity 105-*a* may monitor for a backscattered signal 230 from the energy harvesting device 205. In some examples, the network entity 105-*a* may receive the backscattered signal 230 and may attempt to determine location of the energy harvesting device 205 based on the backscattered signal 230. However, the network entity 105-*a* may be unaware of timing associated with transmission of the backscattered signal 230 and may monitor multiple timing hypothesis to accurately receive the backscattered signal 230, which may increase complexity, reduce reliability, and increase power consumption.

Accordingly, techniques described herein may support backscatter-based positioning determination. For example, the network entity 105-*a* (e.g., an energy transfer device) may transmit, to the energy harvesting device 205, an initial signal 215 including one or more parameters (e.g., timing information and address information associated with the energy harvesting device 205 backscattering a positioning signal 225. In some examples, the one or more parameters (e.g., the timing information) may be transmitted via a sequence previously indicated to the energy harvesting device 205 (e.g., known sequence).

In some cases (e.g., the energy harvesting device 205 does not have a power source), the initial signal 215 may include an energy signal 235 (e.g., power-up portion of the initial signal 215) to provide power to the energy harvesting device 205. Inclusion of the energy signal 235 may be based on a capability of the energy harvesting device 205 (e.g., the energy signal 235 may be omitted if the energy harvest device 205 is a battery device or a semi-passive device). In some examples, a length (e.g., duration) of the energy signal 235 may be based on an energy state (e.g., energy level) of the energy harvesting device 205. Alternatively, the length of the energy signal 235 may be fixed (e.g., based on a configuration of the energy harvesting device 205, the network entity 105-*a*, or both).

As described previously, the initial signal 215 may include signaling 240 indicating the one or more parameters associated with the energy harvesting device 205 backscattering a positioning signal 225. In some examples (e.g., the energy harvesting device 205 is a power-splitting device), the energy harvesting device 205 may harvest energy from the energy signal 235 while decoding the signaling 240 (e.g., simultaneously). Alternatively (e.g., the energy harvesting device 205 is a time-splitting device), the energy harvesting device 205 may harvest energy from the energy signal 235 prior to or following decoding of the signal 240. In such cases, the energy harvesting device 205 may determine a duration of the energy signal 235 (e.g., based on indication from the network entity 105-a, pre-configuration, one or more parameters associated with the energy signal 235, indication in the signaling 240, or the like thereof) such that the energy harvesting device 205 may switch between harvesting energy from the energy signal 235 and decoding the signaling 240.

In some examples, the one or more parameters may include an identifier 245 associated with the energy harvesting device 205 (e.g., a TAG-ID, Reader-ID, device ID, group ID, or the like thereof). In some examples, the network entity 105-a may indicate the identifier 245 explicitly or may indicate the identifier implicitly via a waveform sequency associated with the initial signal 215. As such, the energy harvesting device 205 may determine the initial signal 215 is intended for the energy harvesting device 205 based on the identifier 245 (e.g., the energy harvesting device may only respond to a legit reader).

Additionally, the signaling 240 may include a first subset of the one or more parameters associated with applying a backscattering function to the positioning signal 225, which may be referred to as a configuration 250 in the context of FIG. 2. For example, the configuration 250 may include an indication a frequency shift (e.g., frequency shift and hopping pattern), a phase shift sequence (e.g., device ID and sequency information), or the like thereof.

Additionally, the signaling 240 may include a second subset of the one or more parameters indicating timing information associated with the backscattered signal 230, which may be referred to as timing 255 in the context of FIG. 2. That is, the timing 255 may indicate timing information such that the energy harvesting device 205 may determine when to transmit the backscattered signal 230. For example, the timing 255 may indicate one or more time offsets (e.g., backscatter time offsets, timing offsets) for one or more energy harvesting devices 205. In some examples, the identifier 245 and the timing 255 may be associated with a same signal component or different signal components (e.g., separately optimized). Additionally, or alternatively, one or more components of the initial signal 215 (e.g., the energy signal 235, identifier 245, configuration 250, timing 255, or any combination thereof) may be based on a capability of the energy harvesting device 205 (e.g., if the energy harvesting device 205 is battery or battery-less).

The timing 255 may include an indication of a time offset associated with transmission of the backscattered signal 230. In some examples, the indication of the time offset may be an explicit indication of the time offset, as described with reference to FIG. 3. That is, the timing 255 may include one or more bits indicating a duration of the time offset. In some other examples, the timing 255 may indicate a type of time offset, and the energy harvesting device 205 may determine a duration of the time offset based on the type of time offset. That is, the energy harvesting device 205 may receive control signaling indicating multiple types of time offsets, each associated with a duration of the time offset, such that the timing 255 may indicate a type of time offset from the multiple time offsets. In some other examples, the timing 255 (e.g., and/or the configuration 250) may indicate a type of backscattering function, the backscattering function, a backscattering duration, or any combination thereof, and the energy harvesting device 205 may calculate the time offset based on the type of backscattering function, the backscattering function, the backscattering duration, or any combination thereof, as described with reference to FIG. 4.

As such, the energy harvesting device 205 may detect and receive the initial signal 215 and may decode (e.g., recover) the signaling 240, including the timing 255 (e.g., timing information). Additionally, the network entity 105-a (e.g., a transmitter of a reader located at the network entity 105-a) may transmit the positioning signal 225 (e.g., a positioning reference signal (PRS), reference signal, or the like thereof) to the energy harvesting device 205.

In some examples, a gap 220 may exist between transmission of the initial signal 215 and transmission of the positioning signal 225. The gap 220 may be associated with (e.g., account for) a processing time associated with the energy harvesting device 205 receiving and decoding the initial signal 215. In some examples, the gap 220 may include an energy signal 235, as described with reference to FIG. 5, such that the energy harvesting device 205 may harvest energy from the energy signal 235 during the gap 220. In some examples, the gap 220 may be a fixed duration, while in some other examples, the gap 220 may be zero (e.g., there may not be a gap 220). Additionally, the network entity 105-a may transmit an indication of a duration of the gap in the initial signal 215 (e.g., via the timing 255). Additionally, or alternatively, the gap 220 may include a signal, which may be referred to as a preamble, such that the energy harvesting device 205 may calibrate (e.g., synchronize) timing (e.g., a clock) of the energy harvesting device 205 with timing of the network entity 105-a. For example, the signal transmitted during the gap 220 may include alternating 0 and 1 transmissions, such that the energy harvesting device 205 may perform clock calibration.

Additionally, the energy harvesting device 205 may backscatter the positioning signal 225 by applying the backscatter function to the positioning signal 225, generating the backscattered signal 230, which may also be referred to as a backscattered positioning signal 230 (e.g., such that the backscattered signal 230 is not an unmodified reflection of the positioning signal 225 and can be distinguished from reflections from an inactive object in the environment). In some examples, the energy harvesting device 205 may apply the backscatter function by shifting a frequency of the positioning signal 225 (e.g., applying a frequency shift to the positioning signal 225). That is, the backscatter function may be associated with amplitude-shift keying (ASK). In some examples, one or more values associated with the frequency shift may be indicated in the initial signal 215 (e.g., via the configuration 250) or may be indicated in a control message (e.g., the energy harvesting device 205 may be configured with a frequency hopping pattern to shift the positioning signal 225). Additionally, or alternatively (e.g., the positioning signal 225 is a CW signal), the energy harvesting device 205 may apply the backscatter function by shifting a phase of the positioning signal 225 (e.g., applying a sequence of phase shifts). That is, the backscatter function may be associated with a phase scrambling sequence or phase-shift keying (PSK). In such cases, a bandwidth associated with the positioning signal 225, the backscattered signal 230, or both, may exceed a threshold (e.g., be wide enough) such that applying the phase shift to the positioning signal 225 to generate the backscattered signal 230 may improve timing resolution.

The energy harvesting device 205 may transmit the backscattered signal 230 according to the determine time offset, as described previously. In some cases, the backscattered signal 230 may include timing information and may experience interference (e.g., self-interference) from the positioning signal 225.

In some examples (e.g., the transmitter of the reader and a receiver of the reader are co-located at the network entity 105-a), the energy harvesting device 205 may transmit (e.g., reflect) the backscattered signal 230 to the network entity 105-*a*. In such cases, the network entity 105-*a* may calculate a position of the energy harvesting device 205 based on the time offset and a time of reception of the backscattered signal 230. That is, the network entity 105-*a* may calculate a duration between a reference point of the time offset (e.g., from the perspective of the transmitter of the reader), as described with reference to FIG. 3, and the time of reception of the backscattered signal 230. Additionally, the network entity 105-*a* may calculate the position of the energy harvest device 205 based on a difference between the duration and the time offset (e.g., based on a round-trip-time (RRT)).

Alternatively, (e.g., the transmitter of the reader may be located at the network entity 105-*a* and the receiver of the reader may be located at the network entity 105-*b*), the energy harvesting device 205 may transmit (e.g., reflect) the backscattered signal 230 to the network entity 105-*b*. In some examples, the network entity 105-*a* may transmit one or more coordination signals 260 to the network entity 105-*b*, such that the network entity 105-*b* may calculate the position of the energy harvesting device 205. In such cases, the one or more coordination signals may include the identifier 245, configuration 250, timing 255, an indication of the positioning signal 225, timing information associated with transmitting the positioning signal 225, or any combination thereof. Additionally, the network entity 105-*b* may calculate the position of the energy harvesting device 205 based on the backscattered signal 230 and the one or more coordination signals 260. In such cases, the network entity 105-*b* may transmit an indication of the position of the energy harvesting device 205 to the network entity 105-*a* (e.g., via one or more additional coordination signals 260). Additionally, or alternatively, the network entity 105-*b* may receive the backscattered signal 230 and transmit, to the network entity 105-*a*, one or more coordination signals 260 indicating the time of reception of the backscattered signal 230, such that the network entity 105-*a* may calculate the position of the energy harvesting device 205. In such cases, the network entity 105-*a* may transmit an indication of the position of the energy harvesting device 205 to the network entity 105-*b* (e.g., via one or more additional coordination signals 260).

Additionally, or alternatively, (e.g., the transmitter of the reader may be located at the network entity 105-*a* and a first receiver of the reader may be located at the network entity 105-*b* and one or more second receivers of the reader may be located at one or more additional network entity 105), the energy harvesting device 205 may transmit (e.g., reflect) the backscattered signal 230 to the network entity 105-*b* and one or more additional network entities 105 (e.g., within the coverage area 110-*a*). In such cases, any combination of the network entity 105-*a*, the network entity 105-*b*, and the one or more additional network entities 105 may communicate (e.g., transmit or receive) one or more coordination signals 260, such that any of the network entity 105-*a*, the network entity 105-*b*, and the one or more additional network entities 105 may determine the position of the energy harvesting device 205.

Figure 3:
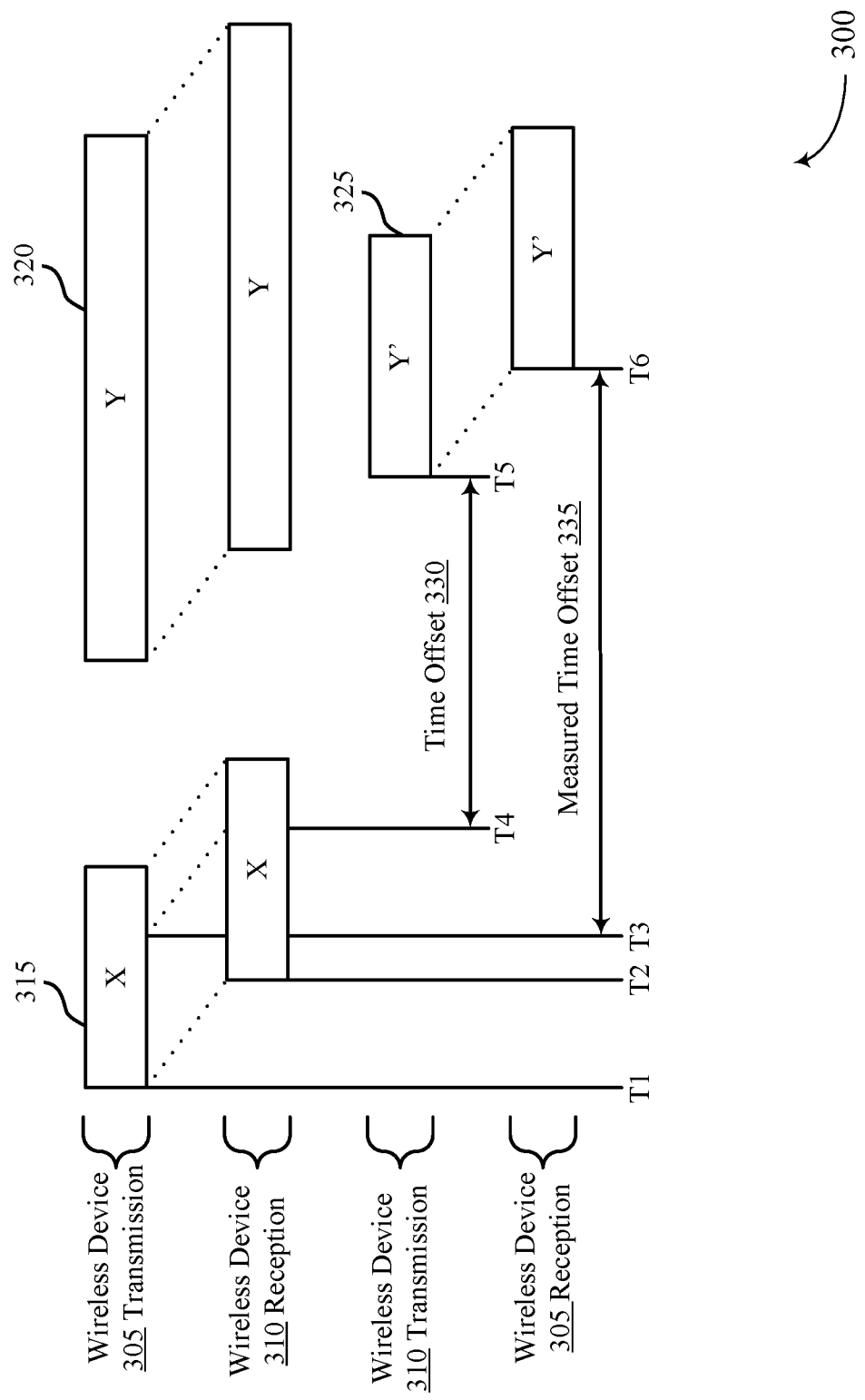
FIG. 3 illustrates an example of a timing diagram that supports techniques for enabling backscatter-based positioning measurements in accordance with one or more aspects of the present disclosure.

FIG. 3 illustrates an example of a timing diagram 300 that supports techniques for enabling backscatter-based positioning measurements in accordance with one or more aspects of the present disclosure. The timing diagram 300 may implement or be implemented by aspects of the wireless communication system 100 and the wireless communications system 200. For example, the timing diagram 300 may be implemented by one or more energy transfer devices 305 and one or more energy harvesting devices 310, which may be examples of network entities 105, UEs 115, or both, as described with reference to FIG. 1. In some examples, an energy transfer device 305 may receive a backscattered signal 325 from an energy harvesting device 310 and calculate a position of the energy harvesting device 310 based on a time offset 330 and a measured time offset 335.

In some examples, as described with reference to FIG. 2, an energy transfer device 305, which may be referred to as a wireless device 305 in the context of FIG. 3, my transmit an initial signal 315 to an energy harvesting device 310, which may be referred to as a wireless device 310 in the context of FIG. 3. The initial signal 315 may include an indication of a time offset 330 associated with transmitting a backscattered signal 325, where the backscattered signal 325 is generated by applying a backscattering function to a positioning signal 320, transmitted by the wireless device 305.

In some examples, the time offset 330 may be explicitly indicated via the initial signal 315. That is, the initial signal 315 may include one or more bits indicating a duration of the time offset 330. Additionally, or alternatively, the initial signal 315 may indicate a type of the time offset 330 and the wireless device 310 may determine the duration of the time offset 330 based on the type of time offset 330. For example, the wireless device 310 may receive, from the wireless device 305, a control message (e.g., configuration message) indicating a first time offset 330 associated with a first duration, a second time offset 330 associated with a second duration, and a third time offset 330 associated with a third duration. As such, the initial signal 315 may indicate the first type of time offset 330, the second type of time offset 330, or the third type of time offset 330, and the wireless device 310 may determine the duration of the time offset 330 based on the indicated type of time offset 330. In some examples, a type of time offset 330, duration of time offset 330, or both, may be based on a capability of the wireless device 310. That is, a duration of a time offset 330 associated with a battery-less device (e.g., battery-less wireless device 310) may be longer than a duration of a time offset 330 associated with a battery-assisted device (e.g., battery-assisted wireless device 310). In some examples, the initial signal 315 may indicate a set of time offsets 330, where each time offset 330 is associated with a wireless device 310 from a set of wireless devices 310 (e.g., based on an identifier, position of the time offset 330 within the set of time offsets 330, or the like thereof), such that each wireless device 310 from the set of wireless devices 310 may transmit a backscattered signal 325 at a different time (e.g., the wireless device 310 of the set of wireless devices 310 backscatter in a time division multiplexing (TDM) manner).

Additionally, the wireless device 310 may initiate a timer associated with the time offset 330. That is, a duration of the timer may be the duration of the time offset 330 and the wireless device 310 may transmit the backscattered signal 325 after (e.g., upon) expiration of the timer. In some examples (e.g., not depicted), the wireless device 310 may initiate the timer after a last symbol of the initial signal 315 (e.g., after reception of the last symbol of the initial signal 315. Alternatively, the wireless device 310 may initiate the timer after a reference symbol or reference slot associated (e.g., after reception of the reference symbol or reference slot). In some examples, the reference symbol or reference slot may be associated with the initial signal 315.

For example, as depicted in FIG. 3, the wireless device 305 may transmit the initial signal 315 at T1. Due to a position of the wireless device 310 relative to the wireless device 305, the wireless device 310 may receive the initial signal 315 at T2. The initial signal 315 may include an indication of the time offset 330 and an indication of the reference symbol (e.g., associated with the initial signal 315). The reference symbol may occur at T3 relative to the wireless device 305 (e.g., relative to transmission of the initial signal 315 by the wireless device 305) and occur at T4 relative to the wireless device 310 (e.g., relative to reception of the initial signal 315 by the wireless device 310) due to a position of the wireless device 310 relative to the wireless device 305. As such, the wireless device 310 may initiate a timer after the reference symbol (e.g., after reception of the reference symbol of the initial signal 315) at T4. Additionally, the wireless device 505 may transmit the positioning signal 320 (e.g., before or after initiation of the timer) and the wireless device 310 may transmit the backscattered signal 325 after (e.g., upon) expiration of the timer at T5, where the backscattered signal 325 is generated based on applying a backscattered function to the positioning signal 320. Due to a position of the wireless device 310 relative to the wireless device 305, the wireless device 305 may receive backscattered signal 325 at T6. Accordingly, the wireless device 305 may determine a duration between the reference symbol relative to the wireless device 305 (e.g., at T3) and reception of the backscattered signal 325 (e.g., at T5). The duration may be referred to as a measured time offset 335. Additionally, the wireless device 305 may compare the measured time offset 335 to the time offset 330 to determine a position of the wireless device 310. That is, the wireless device 305 may subtract the duration of the time offset 330 from the duration of the measured time offset 335 to determine an RRT and calculate the position of the wireless device 310 based on the RRT.

In some examples, the reference symbol or reference slot may be explicitly indicated via the initial signal 315. That is, the initial signal 315 may include one or more bits indicating the reference symbol or reference slot. Additionally, or alternatively, the initial signal 315 may indicate the type of the time offset 330 and the wireless device 310 may determine the reference symbol or reference slot based on the type of time offset 330. For example, as described previously, the wireless device 310 may receive, from the wireless device 305, a control message (e.g., configuration message) indicating the first time offset 330 associated with a first reference symbol or a first reference slot, the second time offset 330 associated with a second reference symbol or a second reference slot, and the third time offset 330 associated with a third reference symbol or a third reference slot. As such, the initial signal 315 may indicate the first type of time offset 330, the second type of time offset 330, or the third type of time offset 330, and the wireless device 510 may determine the reference symbol or the reference slot based on the indicated type of time offset 330.

Figure 4:
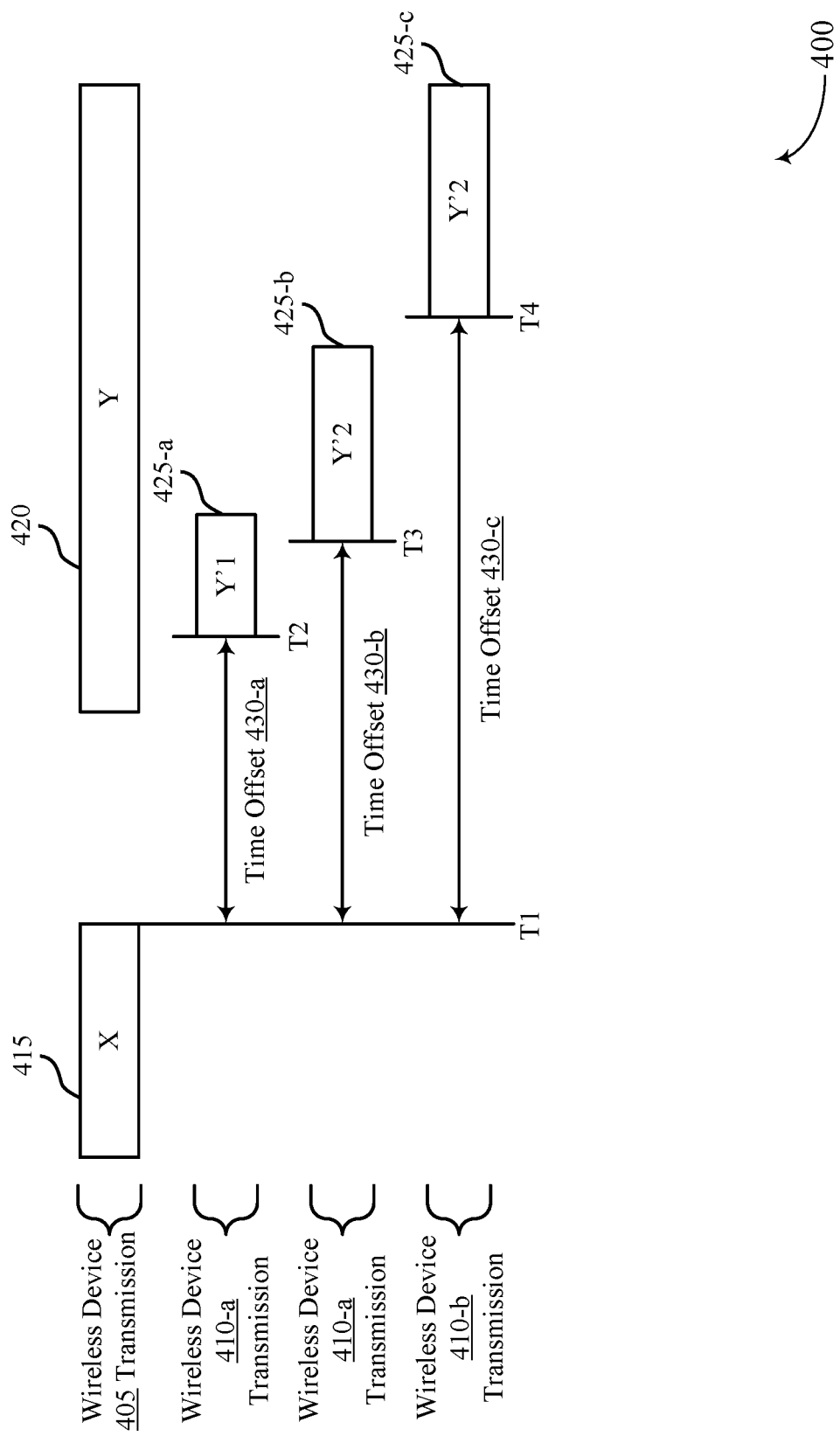
FIG. 4 illustrates an example of a timing diagram that supports techniques for enabling backscatter-based positioning measurements in accordance with one or more aspects of the present disclosure.

FIG. 4 illustrates an example of a timing diagram 400 that supports techniques for enabling backscatter-based positioning measurements in accordance with one or more aspects of the present disclosure. The timing diagram 400 may implement or be implemented by aspects of the wireless communication system 100, the wireless communications system 200, and the timing diagram 300. For example, the timing diagram 400 may be implemented by one or more energy transfer devices 405 and one or more energy harvesting devices 410, which may be examples of network entities 105, UEs 115, or both, as described with reference to FIG. 1. In some examples, an energy transfer device 405 may receive a backscattered signal 425 from an energy harvesting device 410 and calculate a position of the energy harvesting device 410 based on a time offset 430-a and a time of reception of the backscattered signal 425.

In some examples, as described with reference to FIG. 2, an energy transfer device 405, which may be referred to as a wireless device 405 in the context of FIG. 4, my transmit an initial signal 415 to an energy harvesting device 410, which may be referred to as a wireless device 410 in the context of FIG. 4. The initial signal 415 may include an indication of a time offset 430 associated with transmitting a backscattered signal 425, where the backscattered signal 425 is generated by applying a backscattering function to a positioning signal 420, transmitted by the wireless device 405.

In some examples, the indication of the time offset 430 may include an indication of type of backscattering function (e.g., backscattering type), a duration associated with backscattering the positioning signal 420 (e.g., backscattering duration, sequence length), or both. That is, one or more backscattering parameters may be associated with backscattering type, the backscattering duration, or both, such that a wireless device 410 may calculate (e.g., determine) a time offset 430 based on the one or more backscattering parameters.

That is, a wireless device 410 may receive, from a wireless device 505, a control message indicating multiple sets of backscattering parameters, where each set of backscattering parameters is associated with a backscattering type, a backscattering duration, or both. For example, a first backscattering type (e.g., phase scrambling) may be associated with a first set of backscattering parameters, including a first backscattering parameter, $alpha_1$, and a second backscattering parameter, $offset_1$. Additionally, a second backscattering type (e.g., ASK modulation) may be associated with a second set of backscattering parameters, including a third backscattering parameter, $alpha_2$, and a fourth backscattering parameter, $offset_2$. As such, the initial signal 415 may include an indication of the first backscattering type or the second backscattering type, and the wireless device 410 may calculate the time offset 430 based on the indicated backscattering type and Equations 1 and Equation 2 below, where Equation 1 is associated with the first backscattering type and Equation 2 is associated with the second backscattering type:

$$TO_1 = alpha_1 \times backscatterDuration + offset_1 \quad (1)$$

$$TO_2 = alpha_2 \times backscatterDuration + offset_2 \quad (2)$$

where the parameter backscatterDuration may represent the backscattering duration indicated in the initial signal 415 (e.g., duration of the backscattering application/operation).

For example, a wireless device 410-a may receive the initial signal 415 and the initial signal 415 may indicate the first backscattering type and a backscattering duration. As such, the wireless device 410-a may calculate a time offset 430-a based on the first set of backscattering parameters associated with the first backscattering type and the backscattering duration. Further, the wireless device 410-a may apply a backscattering function to the positioning signal 420 based on the first backscattering type and the backscattering duration to generate a backscattered signal 425-a. The wireless device 410-a may transmit the backscattered signal 425-a following expiration of a timer at T2, where a duration of the timer is based on the time offset 430-a.

In another example, the wireless device 410-*a* may receive the initial signal 415 and the initial signal 415 may indicate the second backscattering type and the backscattering duration. As such, the wireless device 410-*a* may calculate a time offset 430-*b* based on the second set of backscattering parameters associated with the second backscattering type and the backscattering duration. Further, the wireless device 410-*a* may apply a backscattering function to the positioning signal 420 based on the second backscattering type and the backscattering duration to generate the backscattered signal 425-*b*. The wireless device 410-*a* may transmit the backscattered signal 425-*b* following expiration of a timer at T3, where a duration of the timer is based on the time offset 430-*b*.

In some examples, one or more of the backscattering parameters (e.g., offset) may be based on an identifier associated with the wireless device 410 (e.g., such that transmissions of backscattered signals 425 by different wireless devices 410 may not collide (e.g., may not cause interference. For example, as described previously, the wireless device 410-*a* may receive the initial signal 415 indicating the second backscattering type and the backscattering duration. Additionally, a wireless device 410-*b* may also receive the initial signal 415 indicating the second backscattering type and the backscattering duration. In such cases, a third set of backscattering parameters may be associated with the second backscattering type, where the second set of backscattering parameters is associated with a first identifier and the third set of backscattering parameters is associated with a second identifier. Further, the first identifier may be associated with the wireless device 410-*a* and the second identifier may be associated with the wireless device 410-*b*.

As such, the wireless device 410-*a* may calculate a time offset 430-*b* based on the second set of backscattering parameters associated with the second backscattering type and the backscattering duration. Additionally, the wireless device 410-*b* may calculate a time offset 430-*c* based on the third set of backscattering parameters associated with the second backscattering type and the backscattering duration. Further, the wireless device 410-*a* may apply a backscattering function to the positioning signal 420 based on the second backscattering type and the backscattering duration to generate the backscattered signal 425-*b* and the wireless device 410-*b* may apply a backscattering function to the positioning signal 420 based on the second backscattering type and the backscattering duration to also generate the backscattered signal 425-*c* (e.g., the backscattered signal 425-*b* and the backscattered signal 425-*c* may be the same or different). Additionally, the wireless device 410-*a* and the wireless device 410-*b* may each initiate a timer at T1, however, a first timer associated with the wireless device 410-*a* may expire at T3 based on the time offset 430-*b* and a second timer associated with the wireless device 410-*b* may expire at T4 based on the time offset 430-*c*. As such, the wireless device 410-*a* may transmit the backscattered signal 425-*b* at T3 and the wireless device 410-*b* may transmit the backscattered signal 425-*c* at T4.

Though described in the context of a wireless device 410-*a* and a wireless device 410-*b*, this is not to be regarded as a limitation of the present disclosure. In this regard, any quantity of wireless devices 410 (e.g., energy harvesting devices 410) may be considered with regards to the techniques described herein. Additionally, though described in the context of a first backscattering type and a second backscattering type, this is also not to be regarded as a limitation of the present disclosure. In this regard, any quantity of backscattering types (e.g., types of backscattering functions) may be considered with regards to the techniques described herein.

Figure 5:
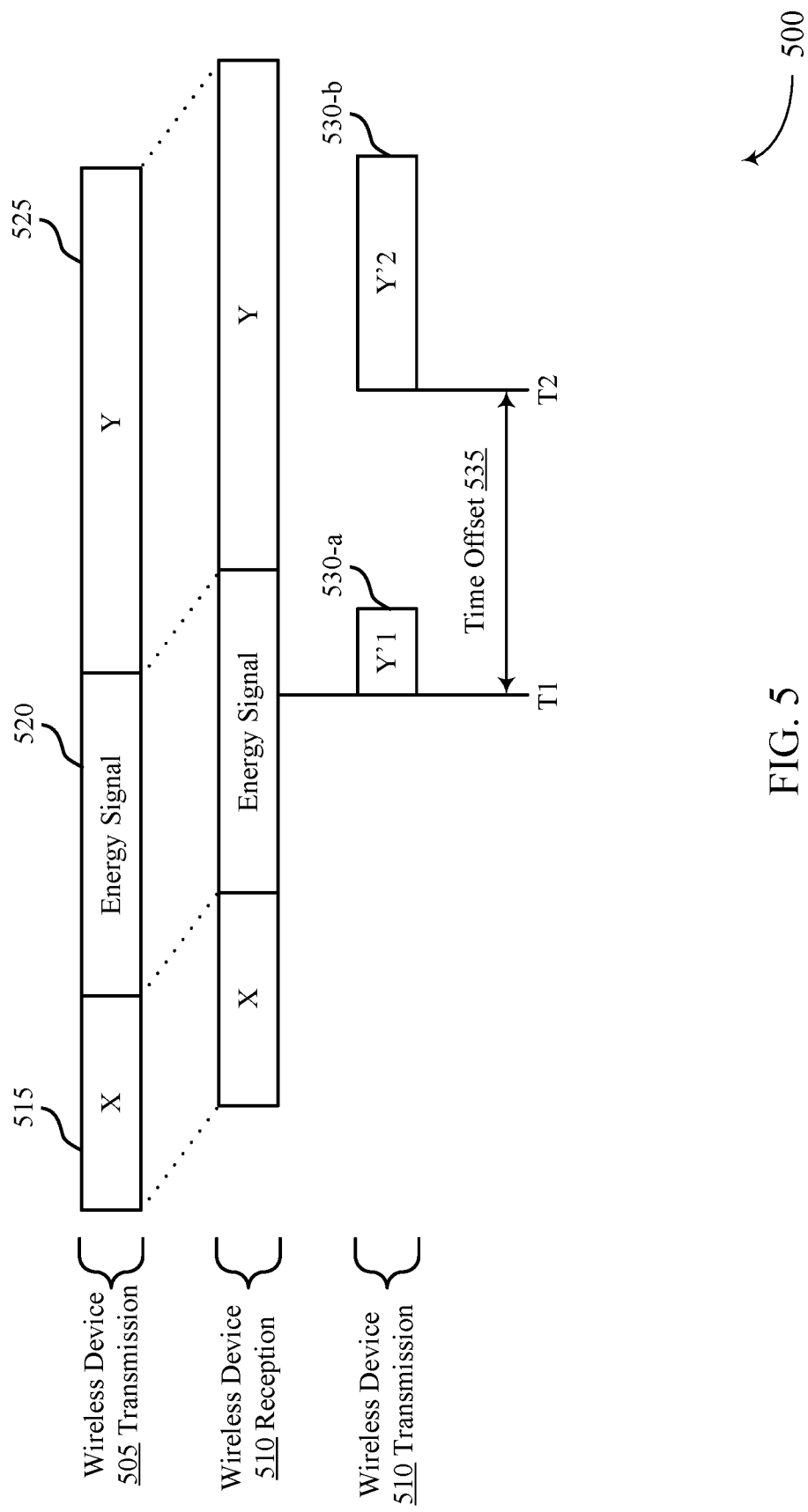
FIG. 5 illustrates an example of a timing diagram that supports techniques for enabling backscatter-based positioning measurements in accordance with one or more aspects of the present disclosure.

FIG. 5 illustrates an example of a timing diagram 500 that supports techniques for enabling backscatter-based positioning measurements in accordance with one or more aspects of the present disclosure. The timing diagram 500 may implement or be implemented by aspects of the wireless communication system 100, the wireless communications system 200, the timing diagram 300, and the timing diagram 400. For example, the timing diagram 500 may be implemented by one or more energy transfer devices 505 and one or more energy harvesting devices 510, which may be examples of network entities 105, UEs 115, or both, as described with reference to FIG. 1. In some examples, an energy transfer device 505 may receive a backscattered signal 530 from an energy harvesting device 510 and calculate a position of the energy harvesting device 510 based on a time offset 535 and a time of reception of the backscattered signal 530.

In some examples, as described with reference to FIG. 2, an energy transfer device 505, which may be referred to as a wireless device 505 in the context of FIG. 5, my transmit an initial signal 515 to an energy harvesting device 510, which may be referred to as a wireless device 510 in the context of FIG. 5. The initial signal 515 may include an indication of a time offset 535 associated with transmitting a backscattered signal 525, where the backscattered signal 525 is generated by applying a backscattering function to a positioning signal 520, transmitted by the wireless device 505.

In some examples, the initial signal 515 may include an indication of an energy threshold associated with the wireless device 510. The energy threshold may be associated with an energy level, power level, voltage level, or any combination thereof, associated with (e.g., required for) a subsequent positioning session, where the positioning session includes transmission of one or more backscattered signals 530. In some cases, the energy threshold (e.g., and the backscattering duration) may be based on a predicted position (e.g., position requirements) of the wireless device 510 relative to the wireless device 510.

For example, after transmitting the initial signal 515, the wireless device 505 may transmit an energy signal 520 (e.g., CW signal) from which the wireless device 510 may harvest energy. The wireless device 510 may harvest energy from the energy signal 520 (e.g., before performing backscattering for a duration) and may transmit a backscattered signal 530-*a* to the wireless device 505 based on an energy level (e.g., energy level, power level, voltage level) satisfying (e.g., meeting or exceeding) the energy threshold at T1. The backscattered signal 530-*a* may be an acknowledgment message indicating that the wireless device 510 is initiating a timer associated with time offset 535 (e.g., having a duration based on the time offset 535). Additionally, or alternatively, the backscattered signal (e.g., message) 530-*a* may indicate that the wireless device 510 is initiating (e.g., is ready for) the positioning session.

As such, the wireless device 510 may initiate the timer after (e.g., upon) transmitting the backscattered signal 530-*a* at T1 and may transmit a backscattered signal 530-*b* after expiration of the timer (e.g., after the time offset 535) at T2, where the backscattered signal 530-*b* is generated by applying a backscattering function to the positioning signal 525 received from the wireless device 505 (e.g., before or after initiation of the time).

Figure 6:
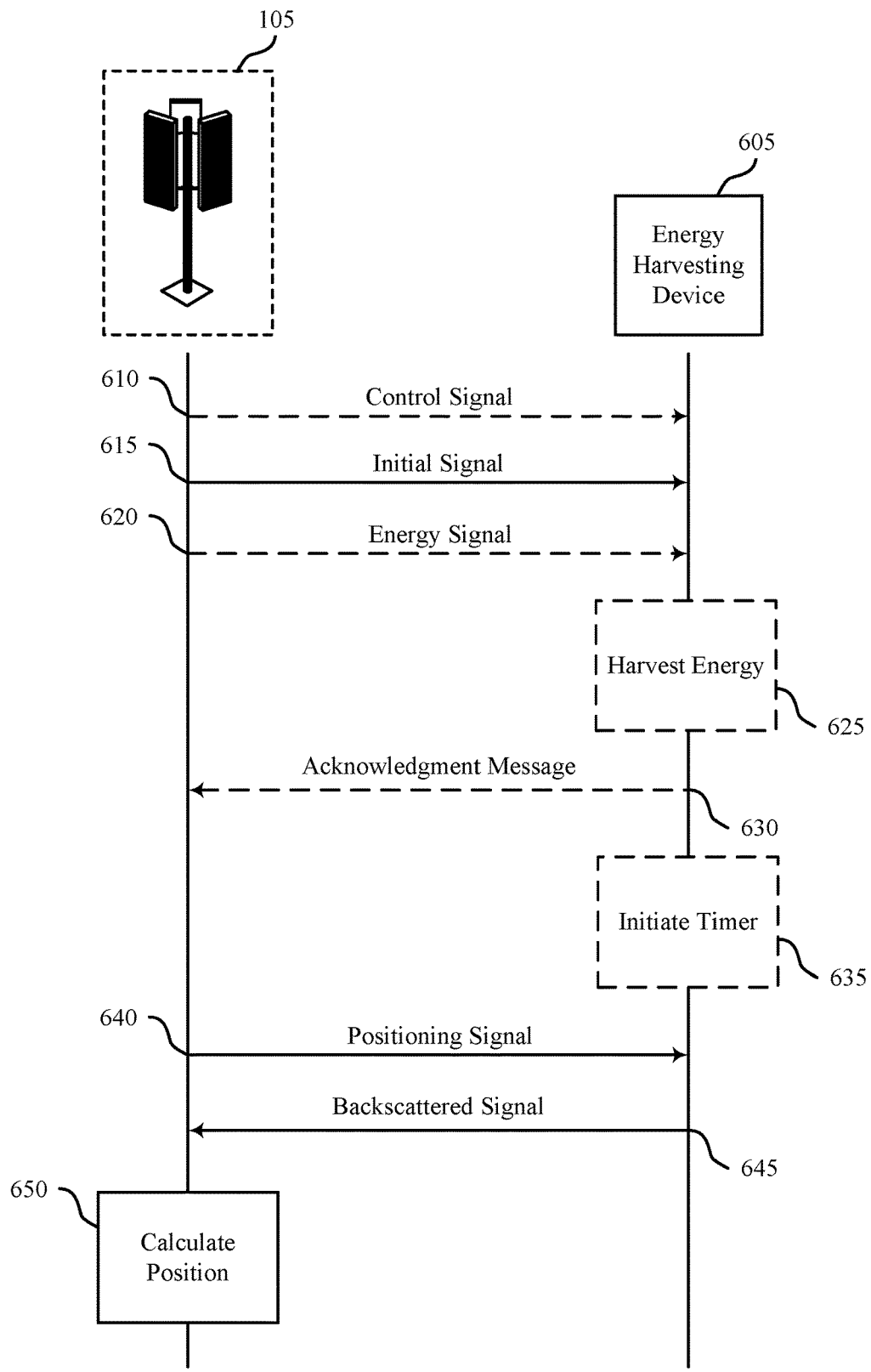
FIG. 6 illustrates an example of a process flow that supports techniques for enabling backscatter-based positioning measurements in accordance with one or more aspects of the present disclosure.

FIG. 6 illustrates an example of a process flow 600 that supports techniques for enabling backscatter-based positioning measurements in accordance with one or more aspects of the present disclosure. The process flow 600 may implement or be implemented by aspects of the wireless communication system 100, the wireless communications system 200, the timing diagram 300, the timing diagram 400, and the timing diagram 500. For example, the wireless communications system 200 may include one or more network entities 105 (e.g., a network entity 105) and one or more UEs 115 (e.g., an energy harvesting device 605), which may represent examples of corresponding devices as described with reference to FIG. 1. In some examples, the network entity 105-a may receive a backscattered signal 230 from an energy harvesting device 205 and calculate a position of the energy harvesting device 205 based on a time offset and a time of reception of the backscattered signal 230.

In some examples, at 610, the energy harvesting device may receive a control signal indicating multiple types of time offsets, where each type of time offset is associated with a duration of a timer, a reference symbol, or both. Additionally, or alternatively, the control signal may indicate multiple sets of backscattering parameters associated with calculating a time offset, where each set of backscattering parameters may be associated with a type of backscattering function from multiple types of backscattering functions.

At 615, the energy harvesting device 605 may receive (e.g., from the network entity 105 or an additional network entity 105) an initial message indicating parameters associated with backscattering a positioning signal, the parameters including an identifier associated with the energy harvesting device 605 and an indication of a time offset associated with transmission of a backscattered positioning signal (e.g., backscattered signal). In some examples, the indication of the time offset may be an explicit indication of a duration of the time offset or may include an indication of a type of time offset from the multiple types of time offsets, where the type of time offset is associated with a duration of the timer. In some examples, the initial signal may further include an energy signal based on the energy harvesting device 605 being a battery-less wireless device.

In some examples, the indication of the time offset may include an indication of a first type of backscattering function from the multiple types of backscattering functions, a backscatter duration, or both. That is, the energy harvesting device may calculate the time offset based on the backscatter duration and a first set of backscattering parameters from the multiple sets of backscattering parameters, where the first set of backscattering parameters is associated with the first type of backscattering function. In some examples, the first set of backscattering parameters may be based on an identifier associated with the energy harvesting device 605.

In some cases, the parameters may indicate multiple time offsets associated with multiple energy harvesting devices 605. In such cases, the multiple energy harvesting devices 605 may include the energy harvesting device 605 depicted in FIG. 6 and the multiple time offsets may include the time offset associated with the energy harvesting device 605 depicted in FIG. 6. In such cases, an identifier may be associated with each time offset and each identifier may be associated with an energy harvesting device 605 from the multiple energy harvesting devices 605.

In some examples, the parameters may indicate an energy threshold. The energy threshold may be associated with a threshold energy level, a threshold power level, a threshold voltage level, or any combination thereof, of the energy harvesting device 605. Additionally, or alternatively, the parameters ma include a duration between reception of the parameters and reception of the positioning signal, a frequency shift associated with the backscattered positioning signal, a phase shift sequence associated with the backscattered positioning signal, the backscattering function, or any combination thereof.

In some examples, at 620, the energy harvesting device 605 may receive an energy signal (e.g., CW signal) based on receiving the initial signal. That is, the energy harvesting device 605 may be a battery-less wireless device and the network entity 105 may transmit the energy signal after the initial signal, such that the energy harvesting device 605 may harvest energy (e.g., charge, power up) from the energy signal.

In some examples, at 625, the energy harvesting device 605 may harvest energy from the energy signal.

In some examples, at 630, the energy harvesting device 605 may transmit an acknowledgment message indicating initiation of a positioning session based on the energy harvesting device satisfying the energy threshold (e.g., further based on the harvesting energy from the energy signal). The positioning session may include initiation of the timer, reception of the positioning signal, transmission of the backscattered signal, or any combination thereof. Additionally, the energy harvesting device 605 may satisfy the energy threshold based on an energy level of the energy harvesting device meeting or exceeding an energy level associated with the threshold, based on a power level of the energy harvesting device meeting or exceeding a power level associated with the threshold, based on a voltage level of the energy harvesting device meeting or exceeding a voltage level associated with the threshold, or any combination thereof.

In some examples, at 635, the energy harvest device may initiate the timer. In some cases, the energy harvest device may initiate the timer following receipt of a reference symbol, where a duration of the timer is based on the time offset indicated via the initial signal. In such cases, the reference symbol (e.g., or slot) may be a last symbol of the initial signal including the parameters or may be based on the type of the time offset indicated via the parameters. Additionally, the duration of the timer, indicated type of time offset, or both, may be based on a capability of the energy harvesting device 605.

At 640, the energy harvesting device 605 may receive (e.g., from the network entity 105 or the additional network entity 105) the positioning signal based on the identifier.

At 645, the energy harvesting device 605 may transmit (e.g., to the network entity 105 or the additional network entity 105) the backscattered positioning signal based on applying a backscattering function to the positioning signal in accordance with the time offset. In some examples, the energy harvesting device may transmit the backscattered positioning signal based on expiration of the timer.

At 650, the network entity 105 may calculate a position of the energy harvesting device 605 based on the time offset and a time of reception of the backscattered positioning signal. In some examples, the network entity 105 may transmit an indication of the position of the energy harvesting device 605 to an additional network entity 105 (e.g., based on receiving an indication of the parameters from the additional network entity 105).

Figure 7:
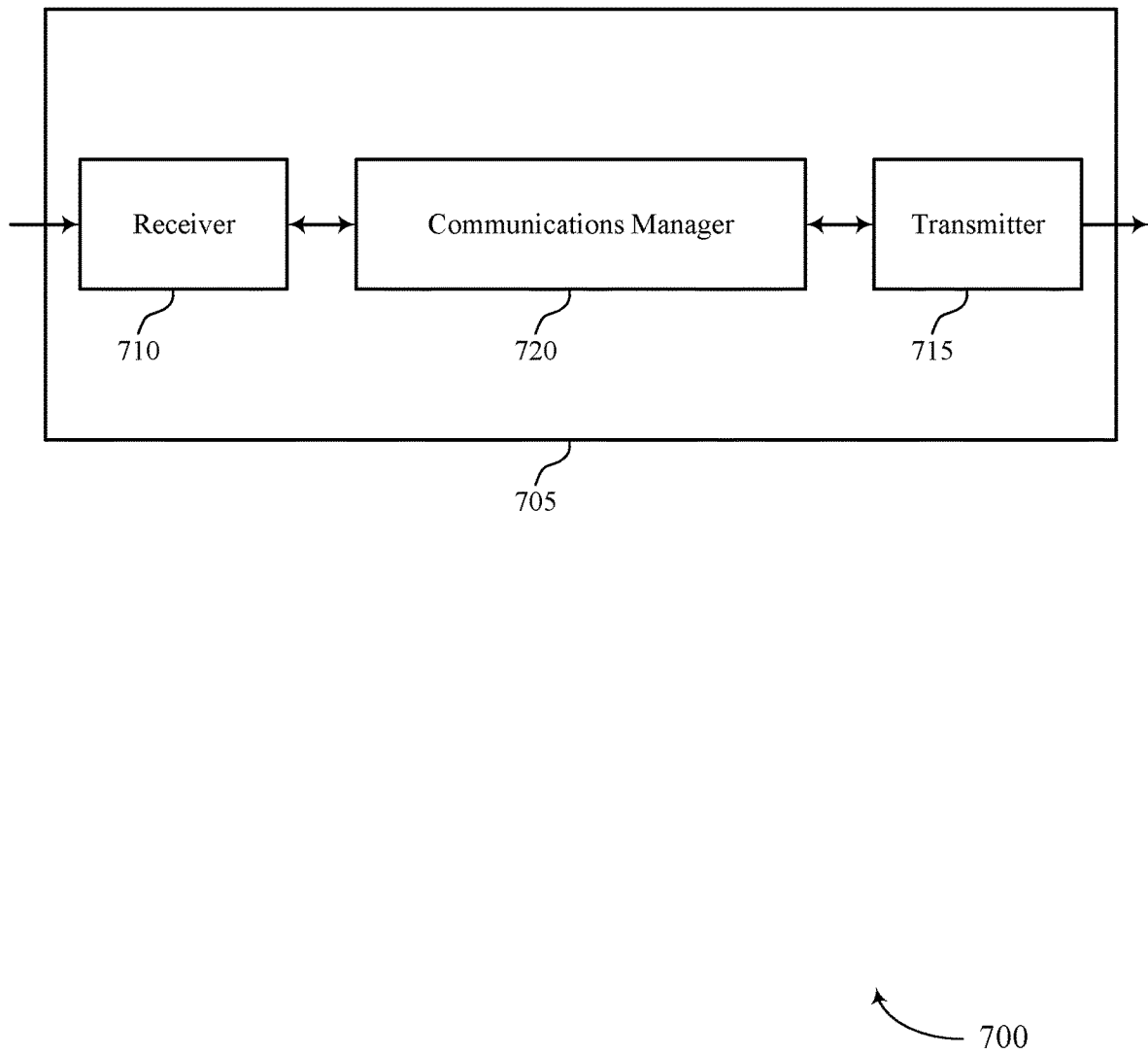
FIGS. 7 and 8 illustrate block diagrams of devices that support techniques for enabling backscatter-based positioning measurements in accordance with one or more aspects of the present disclosure.

FIG. 7 illustrates a block diagram 700 of a device 705 that supports techniques for enabling backscatter-based positioning measurements in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for enabling backscatter-based positioning measurements). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for enabling backscatter-based positioning measurements). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for enabling backscatter-based positioning measurements as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a wireless device in accordance with examples as disclosed herein. For example, the communications manager 720 may be configured as or otherwise support a means for receiving parameters associated with backscattering a positioning signal, the parameters including an identifier associated with the wireless device and an indication of a time offset associated with transmission of a backscattered positioning signal. The communications manager 720 may be configured as or otherwise support a means for receiving the positioning signal based on the identifier. The communications manager 720 may be configured as or otherwise support a means for transmitting the backscattered positioning signal based on applying a backscattering function to the positioning signal in accordance with the time offset.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for backscatter-based positioning measurements which may result in reduced processing, reduced power consumption, and more efficient utilization of communication resources, among other advantages.

Figure 8:
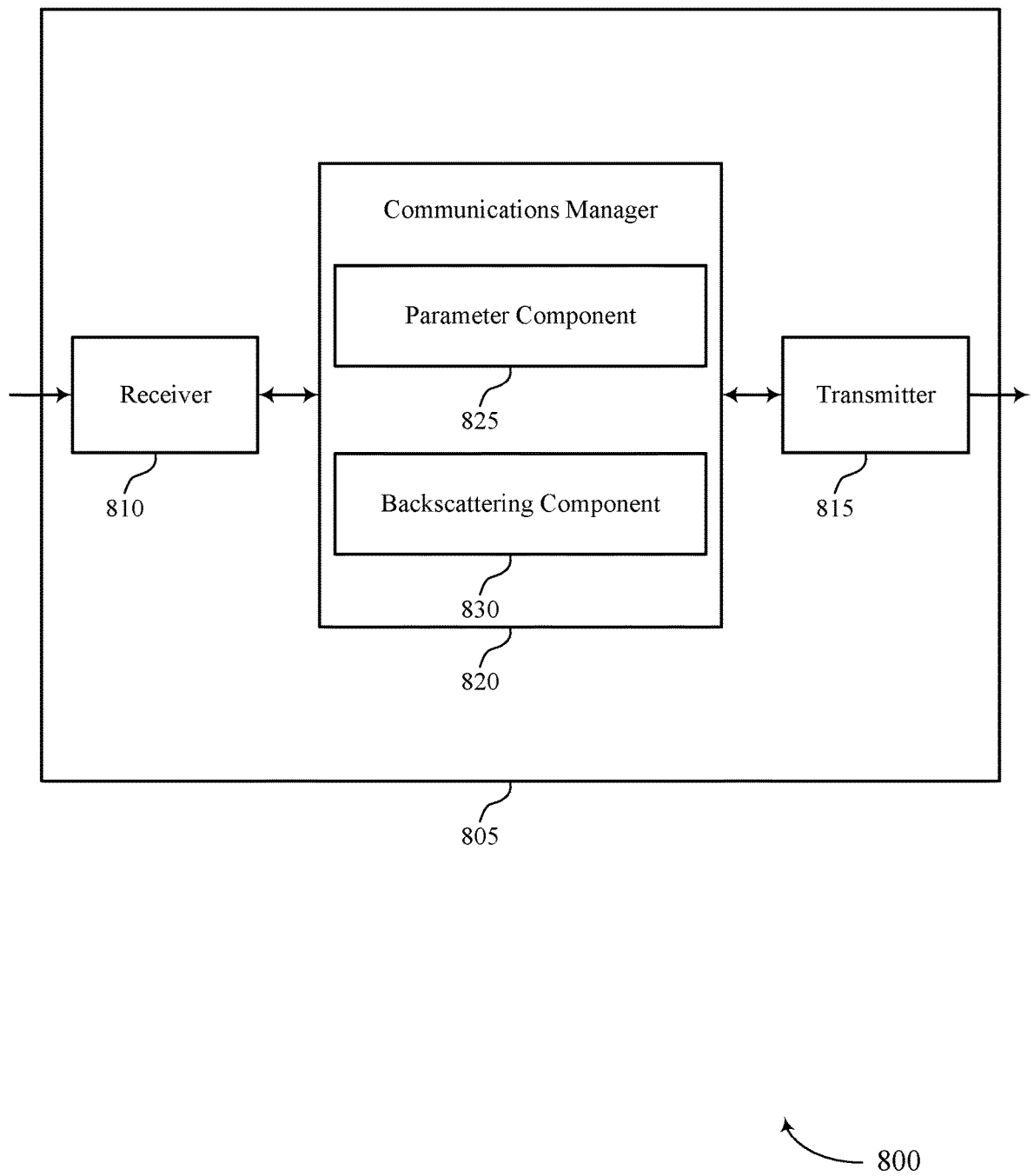

FIG. 8 illustrates a block diagram 800 of a device 805 that supports techniques for enabling backscatter-based positioning measurements in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for enabling backscatter-based positioning measurements). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for enabling backscatter-based positioning measurements). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for enabling backscatter-based positioning measurements as described herein. For example, the communications manager 820 may include a parameter component 825 a backscattering component 830, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a wireless device in accordance with examples as disclosed herein. The parameter component 825 may be configured as or otherwise support a means for receiving parameters associated with backscattering a positioning signal, the parameters including an identifier associated with the wireless device and an indication of a time offset associated with transmission of a backscattered positioning signal. The backscattering component 830 may be configured as or otherwise support a means for receiving the positioning signal based on the identifier. The backscattering component 830 may be configured as or otherwise support a means for transmitting the backscattered positioning signal based on applying a backscattering function to the positioning signal in accordance with the time offset.

Figure 9:
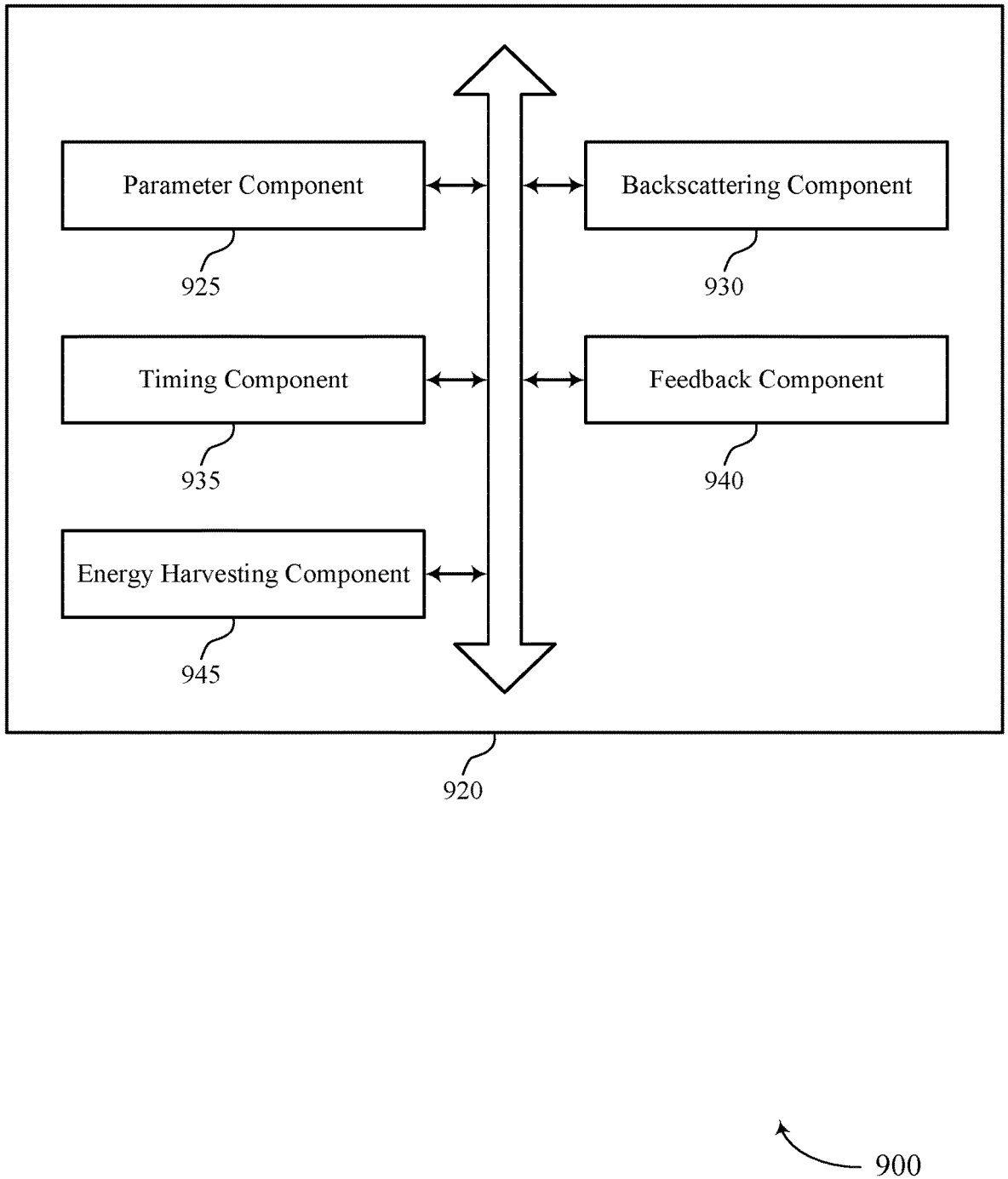
FIG. 9 illustrates a block diagram of a communications manager that supports techniques for enabling backscatter-based positioning measurements in accordance with one or more aspects of the present disclosure.

FIG. 9 illustrates a block diagram 900 of a communications manager 920 that supports techniques for enabling backscatter-based positioning measurements in accordance with one or more aspects of the present disclosure. The communications manager 920 may be an example of aspects of a communications manager 720, a communications manager 820, or both, as described herein. The communications manager 920, or various components thereof, may be an example of means for performing various aspects of techniques for enabling backscatter-based positioning measurements as described herein. For example, the communications manager 920 may include a parameter component 925, a backscattering component 930, a timing component 935, a feedback component 940, an energy harvesting component 945, or any combination thereof. Each of these components may communicate, directly or indirectly, with one another (e.g., via one or more buses).

The communications manager 920 may support wireless communications at a wireless device in accordance with examples as disclosed herein. The parameter component 925 may be configured as or otherwise support a means for receiving parameters associated with backscattering a positioning signal, the parameters including an identifier associated with the wireless device and an indication of a time offset associated with transmission of a backscattered positioning signal. The backscattering component 930 may be configured as or otherwise support a means for receiving the positioning signal based on the identifier. In some examples, the backscattering component 930 may be configured as or otherwise support a means for transmitting the backscattered positioning signal based on applying a backscattering function to the positioning signal in accordance with the time offset.

In some examples, the timing component 935 may be configured as or otherwise support a means for initiating a timer following receipt of a reference symbol, where transmission of the backscattered positioning signal is based on expiration of the timer, and where a duration of the timer is based on the time offset.

In some examples, the reference symbol is a last symbol of an initial signal including the parameters or is based on a type of the time offset.

In some examples, the parameters indicate a first type of time offset from a set of multiple types of time offsets, and the timing component 935 may be configured as or otherwise support a means for receiving a control signal indicating the set of multiple types of time offsets, where each type of time offset of the set of multiple types of time offsets is associated with a duration of the timer, a reference symbol, or both, and where the time offset is based on the indication of the first type of time offset.

In some examples, the duration of the timer, the first type of time offset, or both, are based on a capability of the wireless device.

In some examples, the parameters indicate a set of multiple time offsets associated with a set of multiple wireless devices. In some examples, the set of multiple time offsets includes the time offset. In some examples, the set of multiple wireless devices includes the wireless device.

In some examples, the parameters include an indication of a type of the backscattering function, and the timing component 935 may be configured as or otherwise support a means for calculating the time offset based on a first set of backscattering parameters and a backscatter duration, where the first set of backscattering parameters is based on the type of the backscattering function.

In some examples, the parameter component 925 may be configured as or otherwise support a means for receiving a control signal indicating a set of multiple sets of backscattering parameters associated with calculating the time offset, where each set of backscattering parameters is associated with a type of backscattering function, and where the set of multiple sets of backscattering parameters includes the first set of backscattering parameters.

In some examples, the first set of backscattering parameters are based on the identifier associated with the wireless device.

In some examples, the parameters indicate an energy threshold, and the feedback component 940 may be configured as or otherwise support a means for transmitting an acknowledgment message indicating initiation of a positioning session based on the wireless device satisfying the energy threshold. In some examples, the parameters indicate an energy threshold, and the timing component 935 may be configured as or otherwise support a means for initiating a timer as part of the positioning session following transmission of the acknowledgment message, where transmission of the backscattered positioning signal is based on expiration of the timer, and where a duration of the timer is based on the time offset.

In some examples, the energy harvesting component 945 may be configured as or otherwise support a means for receiving an energy signal based on reception of an initial signal including the parameters. In some examples, the energy harvesting component 945 may be configured as or otherwise support a means for harvesting energy from the energy signal, where the wireless device satisfying the energy threshold is based on harvesting energy from the energy signal.

In some examples, the energy signal is a continuous wave signal.

In some examples, the energy threshold is based on an energy level of the wireless device, a power level of the wireless device, a voltage level of the wireless device, or any combination thereof.

In some examples, an initial signal including the parameters includes an energy signal based on the wireless device being an energy harvesting device.

In some examples, the parameters include an indication of a duration between reception of the parameters and reception of the positioning signal, a frequency shift associated with the backscattered positioning signal, a phase shift sequence associated with the backscattered positioning signal, the backscattering function, a type of the backscattering function, a backscatter duration, an energy threshold, or any combination thereof.

Figure 10:
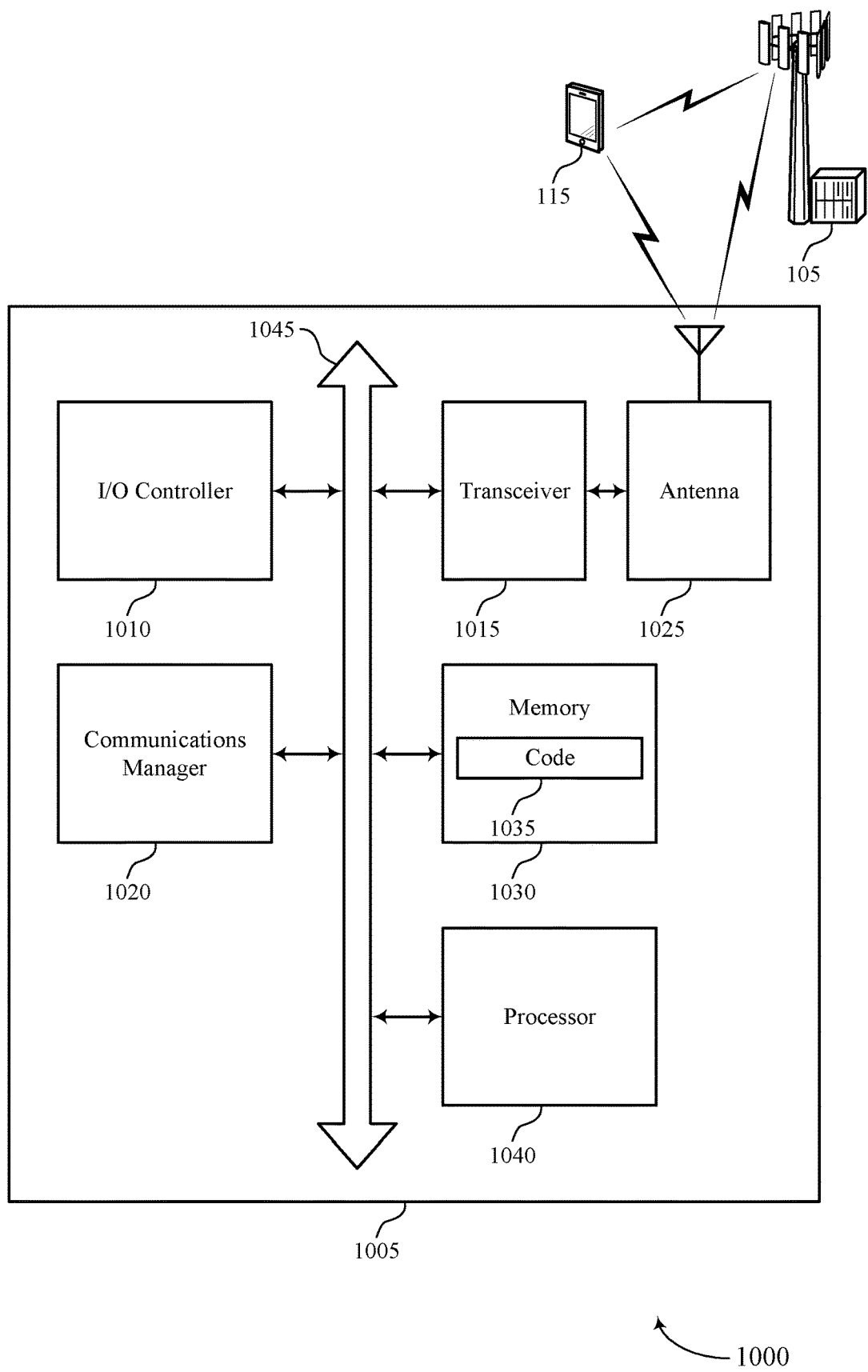
FIG. 10 illustrates a diagram of a system including a device that supports techniques for enabling backscatter-based positioning measurements in accordance with one or more aspects of the present disclosure.

FIG. 10 illustrates a diagram of a system 1000 including a device 1005 that supports techniques for enabling backscatter-based positioning measurements in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for enabling backscatter-based positioning measurements). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a wireless device in accordance with examples as disclosed herein. For example, the communications manager 1020 may be configured as or otherwise support a means for receiving parameters associated with backscattering a positioning signal, the parameters including an identifier associated with the wireless device and an indication of a time offset associated with transmission of a backscattered positioning signal. The communications manager 1020 may be configured as or otherwise support a means for receiving the positioning signal based on the identifier. The communications manager 1020 may be configured as or otherwise support a means for transmitting the backscattered positioning signal based on applying a backscattering function to the positioning signal in accordance with the time offset.

By including or configuring the communications manager 1020 in accordance with examples as described herein, the device 1005 may support techniques for backscatter-based positioning measurements which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for enabling backscatter-based positioning measurements as described herein, or the processor 1040 and the memory 1030 may be otherwise configured to perform or support such operations.

Figure 11:
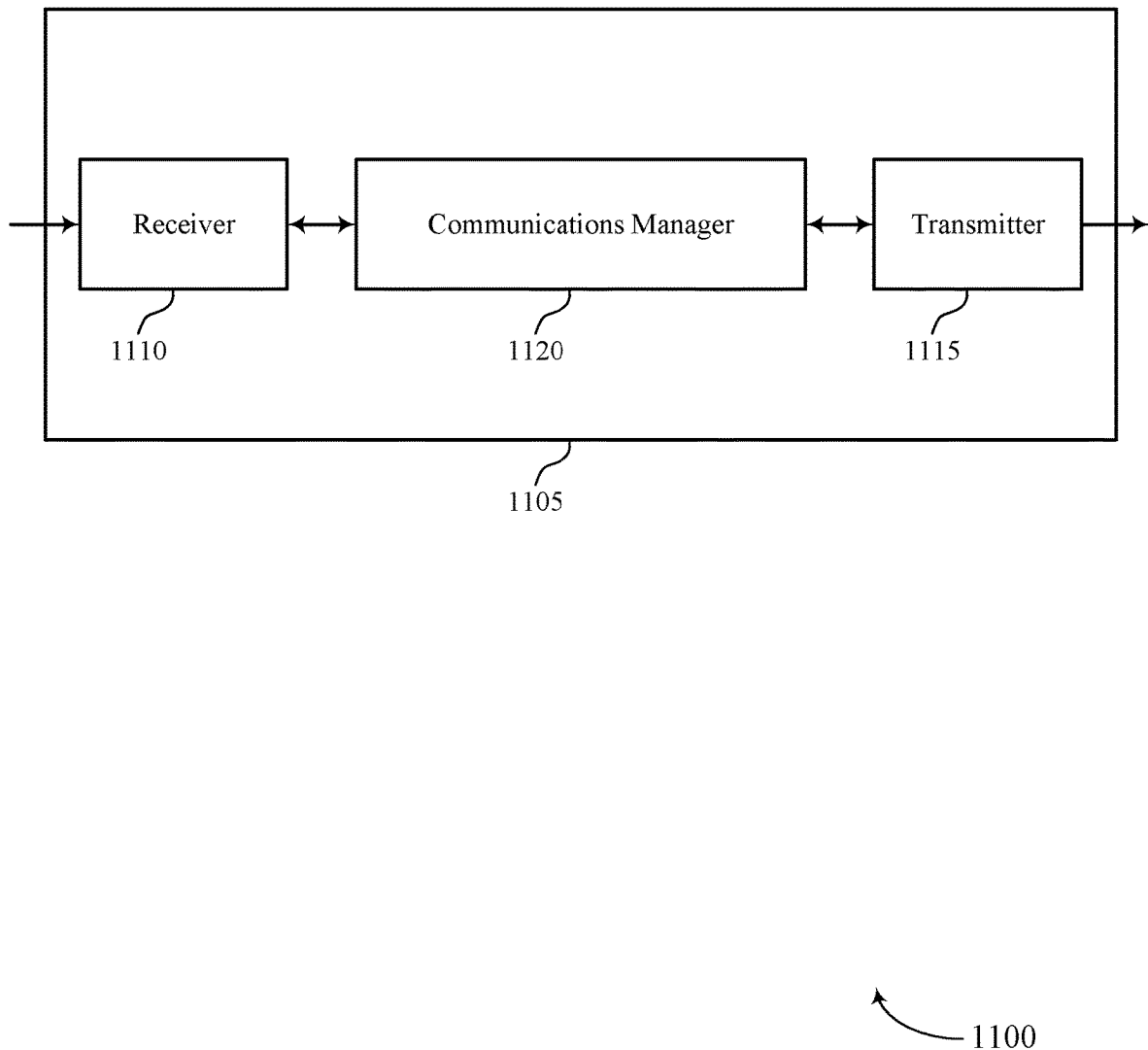
FIGS. 11 and 12 illustrate block diagrams of devices that support techniques for enabling backscatter-based positioning measurements in accordance with one or more aspects of the present disclosure.

FIG. 11 illustrates a block diagram 1100 of a device 1105 that supports techniques for enabling backscatter-based positioning measurements in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of techniques for enabling backscatter-based positioning measurements as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a first wireless device in accordance with examples as disclosed herein. For example, the communications manager 1120 may be configured as or otherwise support a means for communicating parameters associated with a second wireless device backscattering a positioning signal, the parameters including an identifier associated with the second wireless device and an indication of a time offset associated with transmission of a backscattered positioning signal. The communications manager 1120 may be configured as or otherwise support a means for receiving, from the second wireless device, the backscattered positioning signal. The communications manager 1120 may be configured as or otherwise support a means for calculating a position of the second wireless device based on the time offset and a time of reception of the backscattered positioning signal.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for backscatter-based positioning measurements which may result in reduced processing, reduced power consumption, and more efficient utilization of communication resources, among other advantages.

Figure 12:
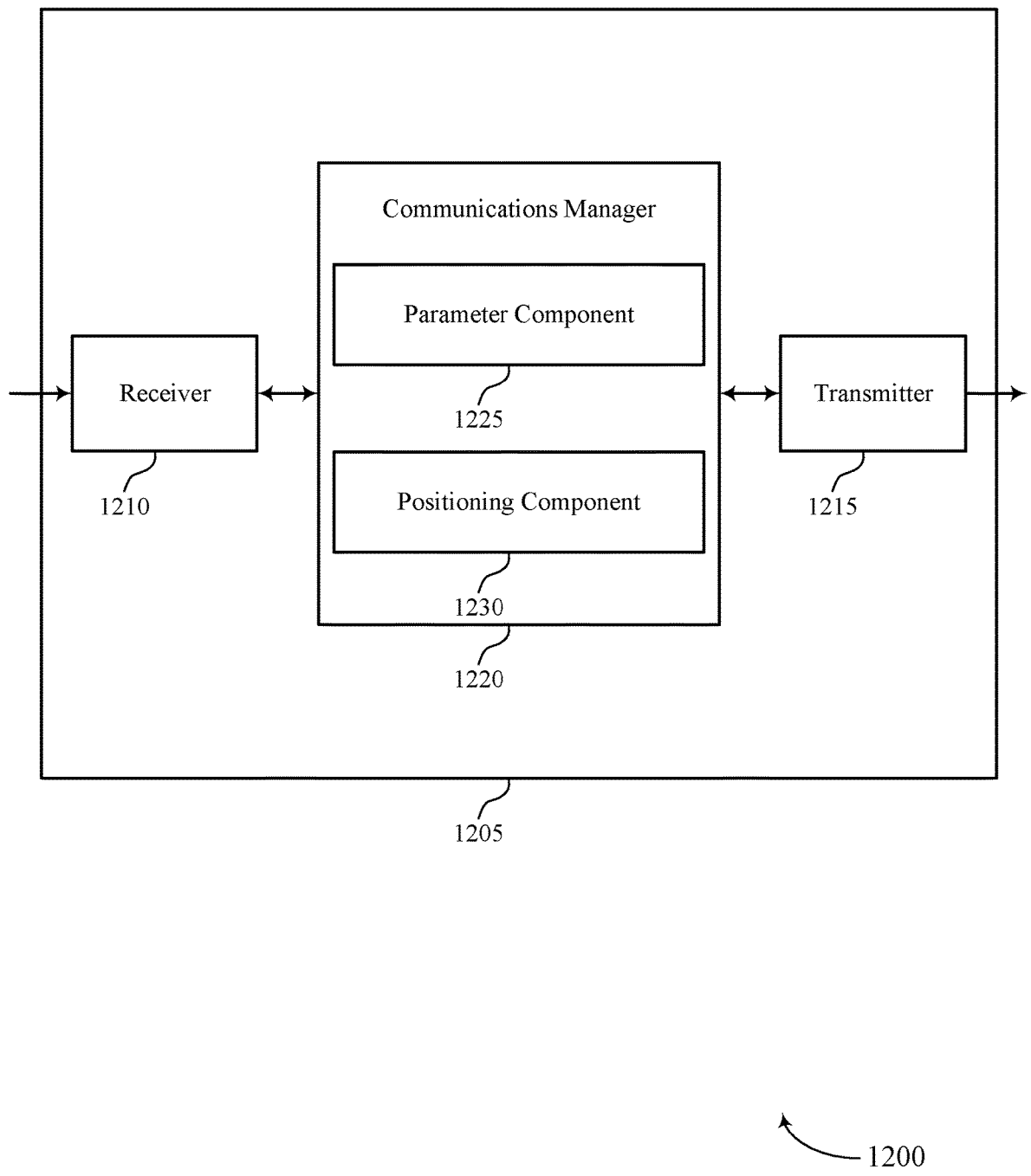

FIG. 12 illustrates a block diagram 1200 of a device 1205 that supports techniques for enabling backscatter-based positioning measurements in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of techniques for enabling backscatter-based positioning measurements as described herein. For example, the communications manager 1220 may include a parameter component 1225 a positioning component 1230, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a first wireless device in accordance with examples as disclosed herein. The parameter component 1225 may be configured as or otherwise support a means for communicating parameters associated with a second wireless device backscattering a positioning signal, the parameters including an identifier associated with the second wireless device and an indication of a time offset associated with transmission of a backscattered positioning signal. The positioning component 1230 may be configured as or otherwise support a means for receiving, from the second wireless device, the backscattered positioning signal. The positioning component 1230 may be configured as or otherwise support a means for calculating a position of the second wireless device based on the time offset and a time of reception of the backscattered positioning signal.

Figure 13:
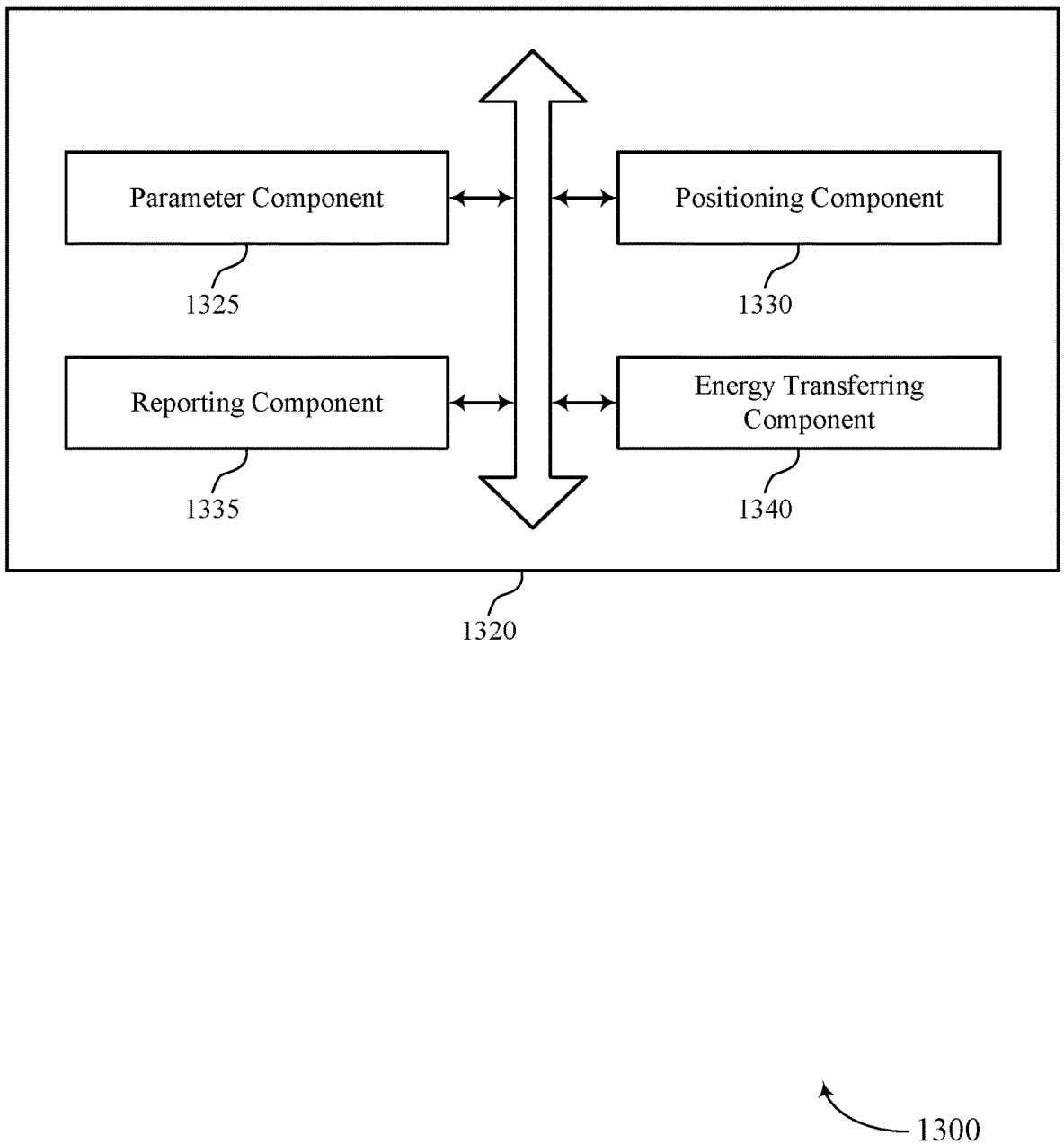
FIG. 13 illustrates a block diagram of a communications manager that supports techniques for enabling backscatter-based positioning measurements in accordance with one or more aspects of the present disclosure.

FIG. 13 illustrates a block diagram 1300 of a communications manager 1320 that supports techniques for enabling backscatter-based positioning measurements in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of techniques for enabling backscatter-based positioning measurements as described herein. For example, the communications manager 1320 may include a parameter component 1325, a positioning component 1330, a reporting component 1335, an energy transferring component 1340, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications at a first wireless device in accordance with examples as disclosed herein. The parameter component 1325 may be configured as or otherwise support a means for communicating parameters associated with a second wireless device backscattering a positioning signal, the parameters including an identifier associated with the second wireless device and an indication of a time offset associated with transmission of a backscattered positioning signal. The positioning component 1330 may be configured as or otherwise support a means for receiving, from the second wireless device, the backscattered positioning signal. In some examples, the positioning component 1330 may be configured as or otherwise support a means for calculating a position of the second wireless device based on the time offset and a time of reception of the backscattered positioning signal.

In some examples, the parameters a first type of time offset from a set of multiple types of time offsets, and the parameter component 1325 may be configured as or otherwise support a means for transmitting a control signal indicating the set of multiple types of time offsets, where each type of time offset of the set of multiple types of time offsets is associated with a duration of a timer, a reference symbol, or both, and where the time offset is based on the indication of the first type of time offset.

In some examples, the parameters indicate a set of multiple time offsets associated with a set of multiple wireless devices. In some examples, the set of multiple time offsets includes the time offset. In some examples, the set of multiple wireless devices includes the second wireless device.

In some examples, the parameters include an indication of a first type of backscattering function associated with a first set of backscattering parameters to be applied by the second wireless device, and the parameter component 1325 may be configured as or otherwise support a means for transmitting a control signal indicating a set of multiple sets of backscattering parameters associated with the second wireless device calculating the time offset, where each set of backscattering parameters is associated with a type of backscattering function, and where the time offset is based on the first set of backscattering parameters from the set of multiple sets of backscattering parameters.

In some examples, the first set of backscattering parameters are based on the identifier associated with the second wireless device.

In some examples, the parameters indicate an energy threshold, and the reporting component 1335 may be configured as or otherwise support a means for receiving an acknowledgment message indicating initiation of a positioning session based on the second wireless device satisfying the energy threshold, where receipt of the backscattered positioning signal is based on the acknowledgment message.

In some examples, the energy transferring component 1340 may be configured as or otherwise support a means for transmitting an energy signal based on transmission of an initial signal including the parameters, where satisfaction of the energy threshold is based on transmission of the energy signal.

In some examples, the energy signal is a continuous wave signal.

In some examples, the energy threshold is based on an energy level of the second wireless device, a power level of the second wireless device, a voltage level of the second wireless device, or any combination thereof.

In some examples, an initial signal including the parameters includes an energy signal based on the second wireless device being an energy harvesting device.

In some examples, the parameters include an indication of a duration between transmission of the parameters and transmission of the positioning signal, a frequency shift associated with the backscattered positioning signal, a phase shift sequence associated with the backscattered positioning signal, a backscattering function to be applied to the positioning signal, a type of the backscattering function, a backscatter duration, or any combination thereof.

In some examples, the parameters are transmitted to the second wireless device, and the positioning component 1330 may be configured as or otherwise support a means for transmitting, to the second wireless device, the positioning signal.

In some examples, the parameters are received from a third wireless device, and the positioning component 1330 may be configured as or otherwise support a means for transmitting, to the third wireless device, an indication of the position of the second wireless device.

Figure 14:
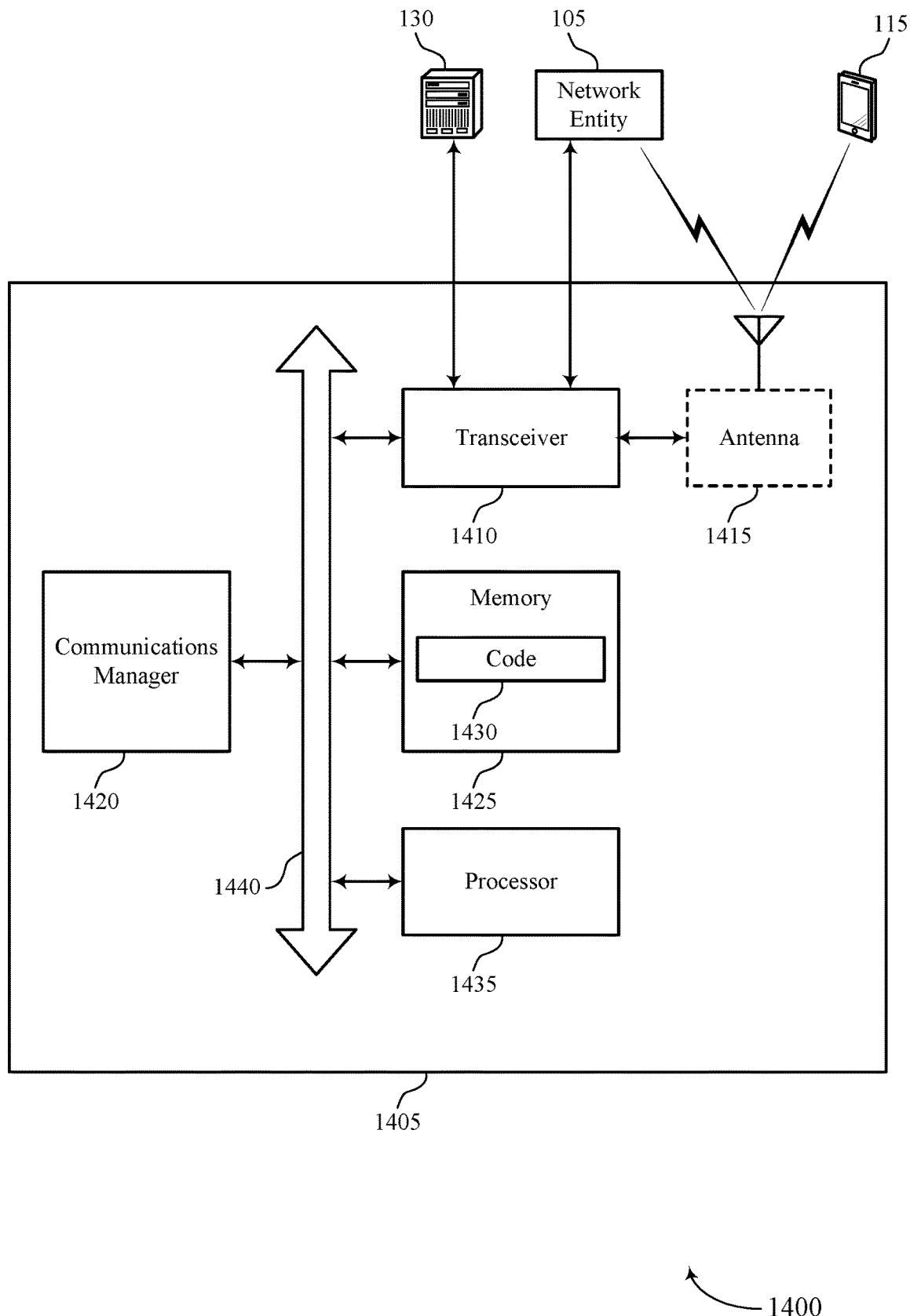
FIG. 14 illustrates a diagram of a system including a device that supports techniques for enabling backscatter-based positioning measurements in accordance with one or more aspects of the present disclosure.

FIG. 14 illustrates a diagram of a system 1400 including a device 1405 that supports techniques for enabling backscatter-based positioning measurements in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting techniques for enabling backscatter-based positioning measurements). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system. A person having ordinary skill in the art will readily recognize that a first interface also may obtain information or signal inputs, and a second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications at a first wireless device in accordance with examples as disclosed herein. For example, the communications manager 1420 may be configured as or otherwise support a means for communicating parameters associated with a second wireless device backscattering a positioning signal, the parameters including an identifier associated with the second wireless device and an indication of a time offset associated with transmission of a backscattered positioning signal. The communications manager 1420 may be configured as or otherwise support a means for receiving, from the second wireless device, the backscattered positioning signal. The communications manager 1420 may be configured as or otherwise support a means for calculating a position of the second wireless device based on the time offset and a time of reception of the backscattered positioning signal.

By including or configuring the communications manager 1420 in accordance with examples as described herein, the device 1405 may support techniques for backscatter-based positioning measurements which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, the processor 1435, the memory 1425, the code 1430, or any combination thereof. For example, the code 1430 may include instructions executable by the processor 1435 to cause the device 1405 to perform various aspects of techniques for enabling backscatter-based positioning measurements as described herein, or the processor 1435 and the memory 1425 may be otherwise configured to perform or support such operations.

Figure 15:
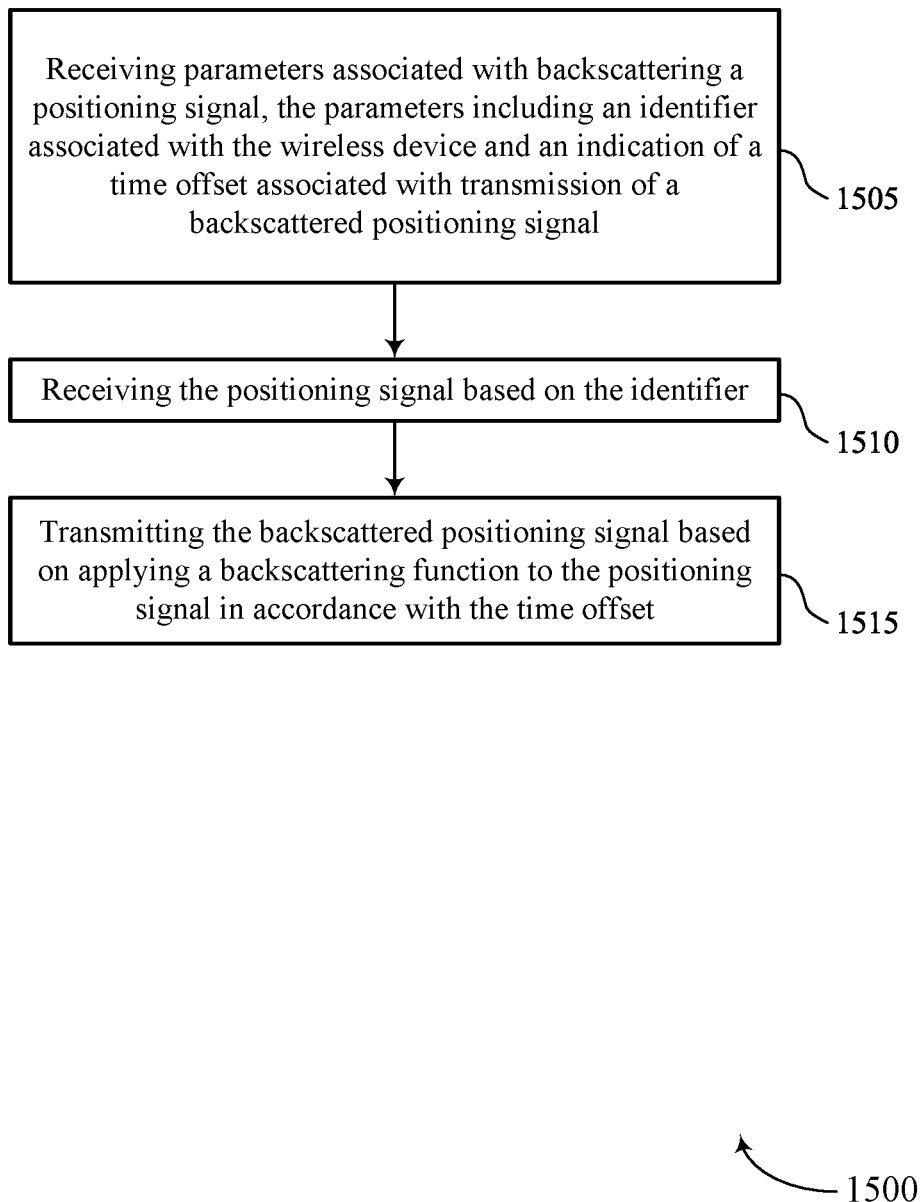
FIGS. 15 through 18 illustrate flowcharts showing methods that support techniques for enabling backscatter-based positioning measurements in accordance with one or more aspects of the present disclosure.

FIG. 15 illustrates a flowchart showing a method 1500 that supports techniques for enabling backscatter-based positioning measurements in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving parameters associated with backscattering a positioning signal, the parameters including an identifier associated with the wireless device and an indication of a time offset associated with transmission of a backscattered positioning signal. The operations of 1505 may be performed in accordance with examples as disclosed herein. In some examples, aspects of the operations of 1505 may be performed by a parameter component 925 as described with reference to FIG. 9.

At 1510, the method may include receiving the positioning signal based on the identifier. The operations of 1510 may be performed in accordance with examples as disclosed herein. In some examples, aspects of the operations of 1510 may be performed by a backscattering component 930 as described with reference to FIG. 9.

At 1515, the method may include transmitting the backscattered positioning signal based on applying a backscattering function to the positioning signal in accordance with the time offset. The operations of 1515 may be performed in accordance with examples as disclosed herein. In some examples, aspects of the operations of 1515 may be performed by a backscattering component 930 as described with reference to FIG. 9.

Figure 16:
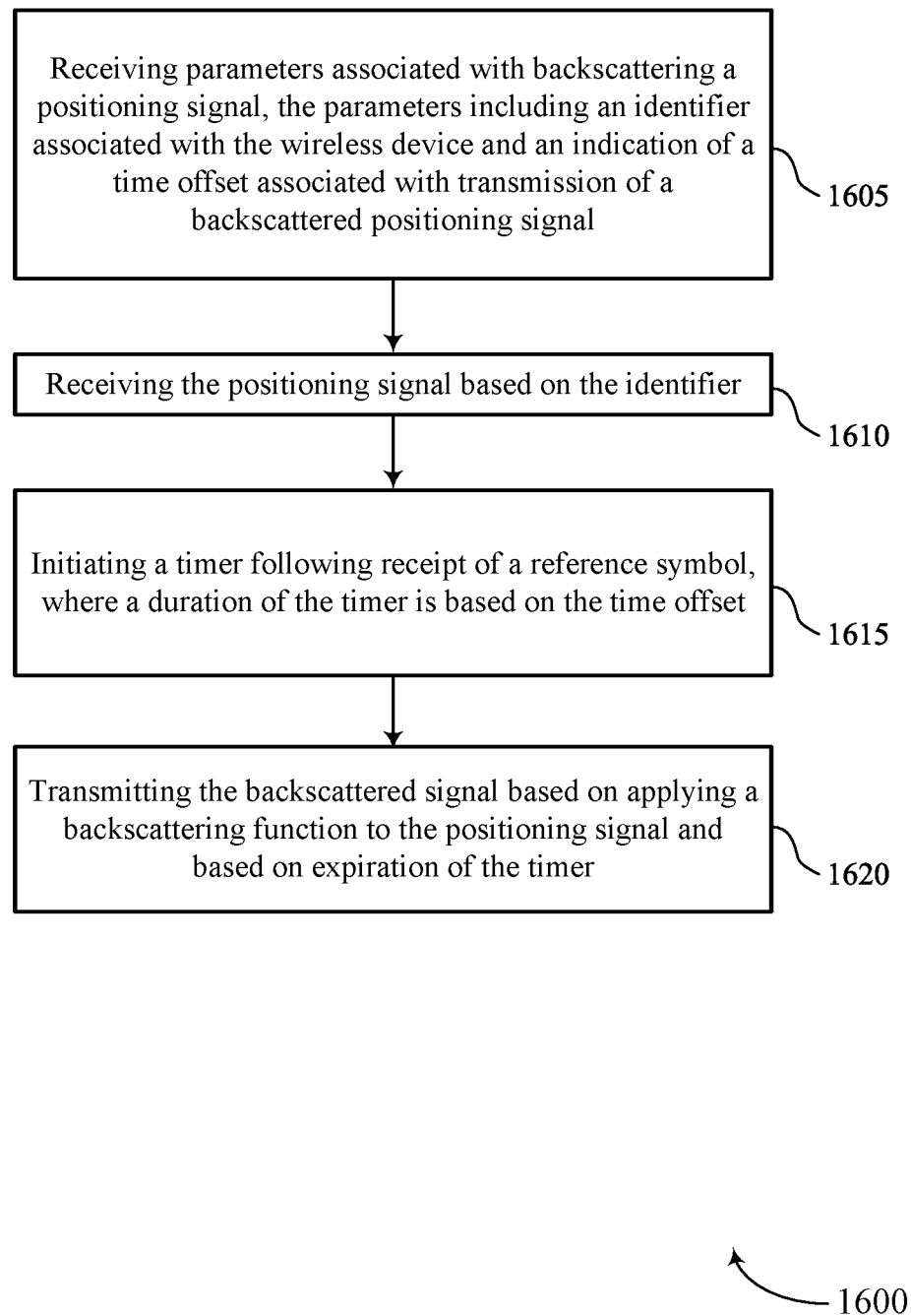

FIG. 16 illustrates a flowchart showing a method 1600 that supports techniques for enabling backscatter-based positioning measurements in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include receiving parameters associated with backscattering a positioning signal, the parameters including an identifier associated with the wireless device and an indication of a time offset associated with transmission of a backscattered positioning signal. The operations of 1605 may be performed in accordance with examples as disclosed herein. In some examples, aspects of the operations of 1605 may be performed by a parameter component 925 as described with reference to FIG. 9.

At 1610, the method may include receiving the positioning signal based on the identifier. The operations of 1610 may be performed in accordance with examples as disclosed herein. In some examples, aspects of the operations of 1610 may be performed by a backscattering component 930 as described with reference to FIG. 9.

At 1615, the method may include initiating a timer following receipt of a reference symbol, where a duration of the timer is based on the time offset. The operations of 1615 may be performed in accordance with examples as disclosed herein. In some examples, aspects of the operations of 1615 may be performed by a timing component 935 as described with reference to FIG. 9.

At 1620, the method may include transmitting the backscattered positioning signal based on applying a backscattering function to the positioning signal and based on expiration of the timer. The operations of 1620 may be performed in accordance with examples as disclosed herein. In some examples, aspects of the operations of 1620 may be performed by a backscattering component 930 as described with reference to FIG. 9.

Figure 17:
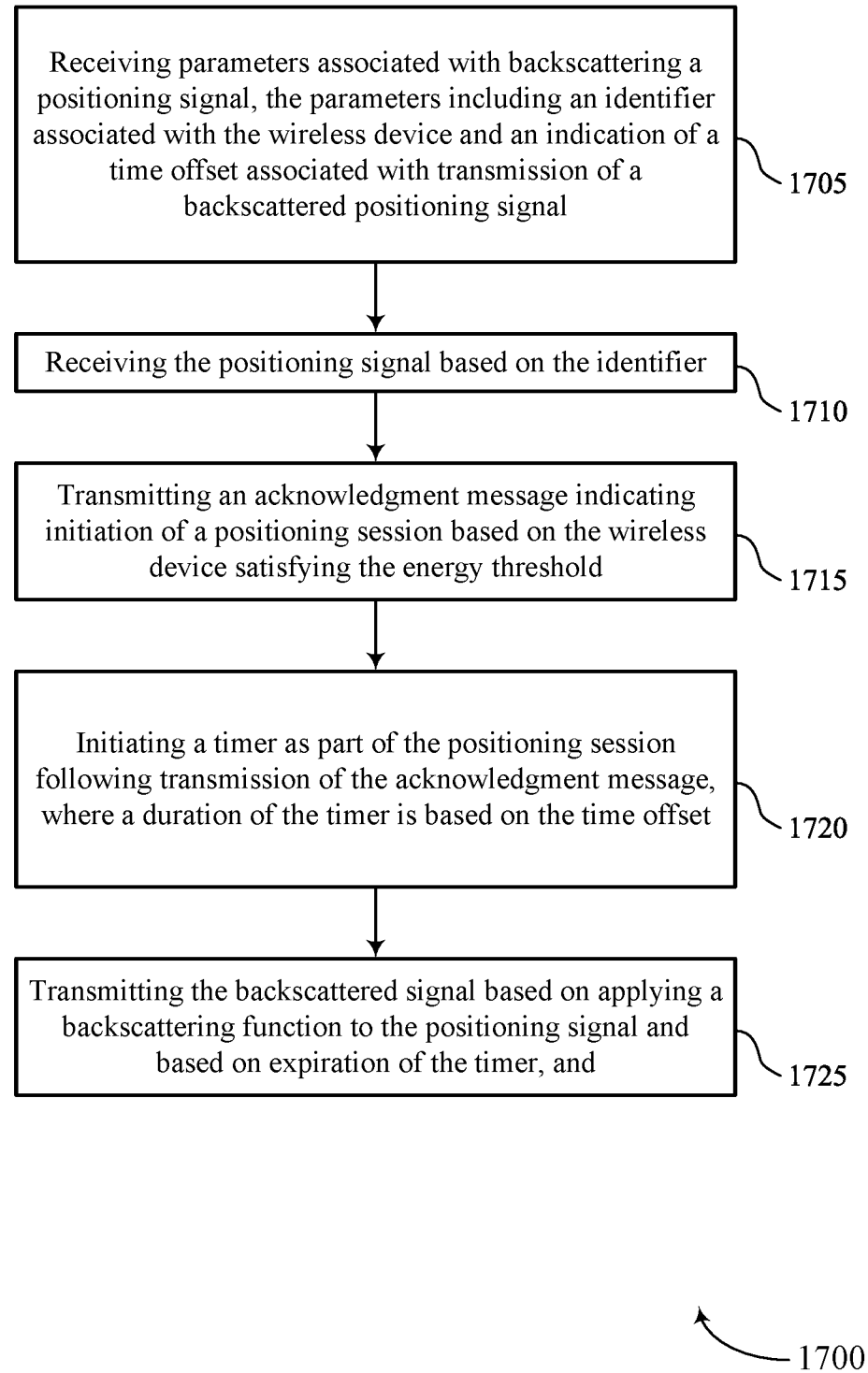

FIG. 17 illustrates a flowchart showing a method 1700 that supports techniques for enabling backscatter-based positioning measurements in accordance with one or more aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1705, the method may include receiving parameters associated with backscattering a positioning signal, the parameters including an identifier associated with the wireless device and an indication of a time offset associated with transmission of a backscattered positioning signal. The operations of 1705 may be performed in accordance with examples as disclosed herein. In some examples, aspects of the operations of 1705 may be performed by a parameter component 925 as described with reference to FIG. 9.

At 1710, the method may include receiving the positioning signal based on the identifier. The operations of 1710 may be performed in accordance with examples as disclosed herein. In some examples, aspects of the operations of 1710 may be performed by a backscattering component 930 as described with reference to FIG. 9.

At 1715, the method may include transmitting an acknowledgment message indicating initiation of a positioning session based on the wireless device satisfying the energy threshold. The operations of 1715 may be performed in accordance with examples as disclosed herein. In some examples, aspects of the operations of 1715 may be performed by a feedback component 940 as described with reference to FIG. 9.

At 1720, the method may include initiating a timer as part of the positioning session following transmission of the acknowledgment message, where a duration of the timer is based on the time offset. The operations of 1720 may be performed in accordance with examples as disclosed herein. In some examples, aspects of the operations of 1720 may be performed by a timing component 935 as described with reference to FIG. 9.

At 1725, the method may include transmitting the backscattered positioning signal based on applying a backscattering function to the positioning signal and based on expiration of the timer. The operations of 1725 may be performed in accordance with examples as disclosed herein. In some examples, aspects of the operations of 1725 may be performed by a backscattering component 930 as described with reference to FIG. 9.

Figure 18:
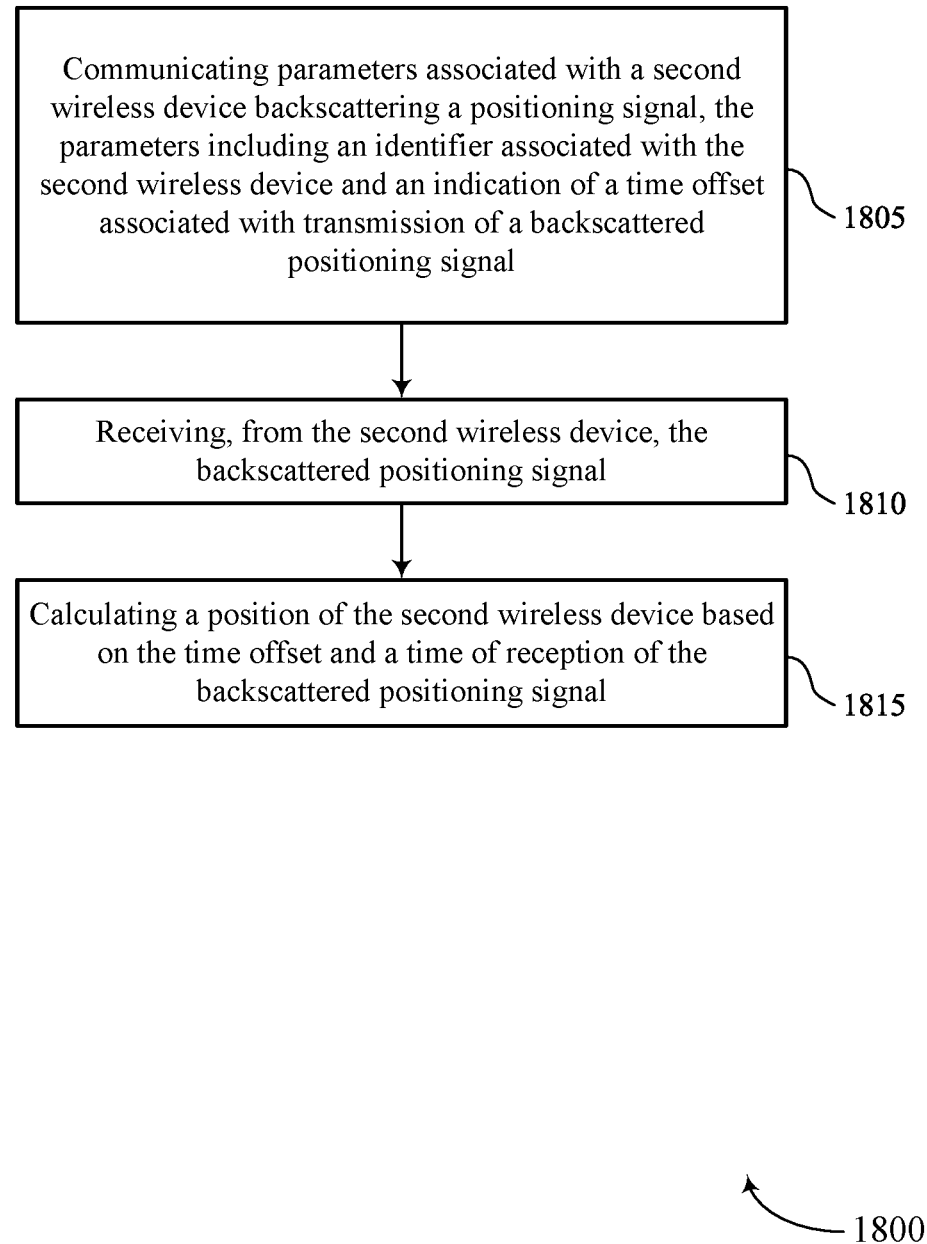

FIG. 18 illustrates a flowchart showing a method 1800 that supports techniques for enabling backscatter-based positioning measurements in accordance with one or more aspects of the present disclosure. The operations of the method 1800 may be implemented by a network entity or its components as described herein. For example, the operations of the method 1800 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1805, the method may include communicating parameters associated with a second wireless device backscattering a positioning signal, the parameters including an identifier associated with the second wireless device and an indication of a time offset associated with transmission of a backscattered positioning signal. The operations of 1805 may be performed in accordance with examples as disclosed herein. In some examples, aspects of the operations of 1805 may be performed by a parameter component 1325 as described with reference to FIG. 13.

At 1810, the method may include receiving, from the second wireless device, the backscattered positioning signal. The operations of 1810 may be performed in accordance with examples as disclosed herein. In some examples, aspects of the operations of 1810 may be performed by a positioning component 1330 as described with reference to FIG. 13.

At 1815, the method may include calculating a position of the second wireless device based on the time offset and a time of reception of the backscattered positioning signal. The operations of 1815 may be performed in accordance with examples as disclosed herein. In some examples, aspects of the operations of 1815 may be performed by a positioning component 1330 as described with reference to FIG. 13.

The following provides an overview of aspects of the present disclosure:

Aspect 1: A method for wireless communications at a wireless device, comprising: receiving parameters associated with backscattering a positioning signal, the parameters including an identifier associated with the wireless device and an indication of a time offset associated with transmission of a backscattered positioning signal receiving the positioning signal based at least in part on the identifier; and transmitting the backscattered positioning signal based at least in part on applying a backscattering function to the positioning signal in accordance with the time offset.

Aspect 2: The method of aspect 1, further comprising: initiating a timer following receipt of a reference symbol, wherein transmission of the backscattered positioning signal is based at least in part on expiration of the timer, and wherein a duration of the timer is based at least in part on the time offset.

Aspect 3: The method of aspect 2, wherein the reference symbol is a last symbol of an initial signal including the parameters or is based at least in part on a type of the time offset.

Aspect 4: The method of any of aspects 2 through 3, wherein the parameters indicates a first type of time offset from a plurality of types of time offsets, the method further comprising: receiving a control signal indicating the plurality of types of time offsets, wherein each type of time offset of the plurality of types of time offsets is associated with a duration of the timer, a reference symbol, or both, and wherein the time offset is based at least in part on the indication of the first type of time offset.

Aspect 5: The method of aspect 4, wherein the duration of the timer, the first type of time offset, or both, are based at least in part on a capability of the wireless device.

Aspect 6: The method of any of aspects 1 through 5, the parameters indicate a plurality of time offsets associated with a plurality of wireless devices, and the plurality of time offsets comprises the time offset, and wherein the plurality of wireless devices comprises the wireless device.

Aspect 7: The method of any of aspects 1 through 6, wherein the parameters comprise an indication of a type of the backscattering function, a backscatter duration, or both, the method further comprising: calculating the time offset based at least in part on a first set of backscattering parameters and a backscatter duration, wherein the first set of backscattering parameters is based at least in part on the type of the backscattering function.

Aspect 8: The method of aspect 7, further comprising: receiving a control signal indicating a plurality of sets of backscattering parameters associated with calculating the time offset, wherein each set of backscattering parameters is associated with a type of backscattering function, and wherein the plurality of sets of backscattering parameters comprises the first set of backscattering parameters.

Aspect 9: The method of any of aspects 7 through 8, wherein the first set of backscattering parameters are based at least in part on the identifier associated with the wireless device.

Aspect 10: The method of aspect 1, wherein the parameters indicate an energy threshold, the method further comprising: transmitting an acknowledgment message indicating initiation of a positioning session based at least in part on the wireless device satisfying the energy threshold; and initiating a timer as part of the positioning session following transmission of the acknowledgment message, wherein transmission of the backscattered positioning signal is based at least in part on expiration of the timer, and wherein a duration of the timer is based at least in part on the time offset.

Aspect 11: The method of aspect 10, further comprising: receiving an energy signal based at least in part on reception of an initial signal including the parameters; and harvesting energy from the energy signal, wherein the wireless device satisfy the energy threshold is based at least in part on harvesting energy from the energy signal.

Aspect 12: The method of aspect 11, wherein the energy signal is a CW signal.

Aspect 13: The method of any of aspects 10 through 12, wherein the energy threshold is based at least in part on an energy level of the wireless device, a power level of the wireless device, a voltage level of the wireless device, or any combination thereof.

Aspect 14: The method of any of aspects 1 through 13, wherein an initial signal including the parameters further includes an energy signal based at least in part on the wireless device being an energy harvesting device.

Aspect 15: The method of any of aspects 1 through 14, wherein the parameters include an indication of a duration between reception of the parameters and reception of the positioning signal, a frequency shift associated with the backscattered positioning signal, a phase shift sequence associated with the backscattered positioning signal, the backscattering function, a type of the backscattering function, a backscatter duration, an energy threshold, or any combination thereof.

Aspect 16: A method for wireless communications at a first wireless device, comprising: communicating parameters associated with a second wireless device backscattering a positioning signal, the parameters including an identifier associated with the second wireless device and an indication of a time offset associated with transmission of a backscattered positioning signal; receiving, from the second wireless device, the backscattered positioning signal; and calculating a position of the second wireless device based at least in part on the time offset and a time of reception of the backscattered positioning signal.

Aspect 17: The method of aspect 16, wherein the parameters indicates a first type of time offset from a plurality of types of time offsets, the method further comprising: transmitting a control signal indicating the plurality of types of time offsets, wherein each type of time offset of the plurality of types of time offsets is associated with a duration of a timer, a reference symbol, or both, and wherein the time offset is based at least in part on the indication of the first type of time offset Aspect 18: The method of any of aspects 16 through 17, wherein the parameters indicate a plurality of time offsets associated with a plurality of wireless devices, and the plurality of time offsets comprises the time offset, and the plurality of wireless devices comprises the second wireless device.

Aspect 19: The method of any of aspects 16 through 18, wherein the parameters comprise an indication of a first type of backscattering function associated with a first set of backscattering parameters to be applied by the second wireless device, a backscatter duration, or both, the method further comprising: transmitting a control signal indicating a plurality of sets of backscattering parameters associated with the second wireless device calculating the time offset, wherein each set of backscattering parameters is associated with a type of backscattering function, and wherein the time offset is based at least in part on the first set of backscattering parameters from the plurality of sets of backscattering parameters.

Aspect 20: The method of aspect 19, wherein the first set of backscattering parameters are based at least in part on the identifier associated with the second wireless device.

Aspect 21: The method of aspect 16, wherein the parameters indicate an energy threshold, the method further comprising: receiving an acknowledgment message indicating initiation of a positioning session based at least in part on the second wireless device satisfying the energy threshold, wherein receipt of the backscattered positioning signal is based at least in part on the acknowledgment message.

Aspect 22: The method of aspect 21, further comprising: transmitting an energy signal based at least in part on transmission of an initial signal including the parameters, wherein satisfaction of the energy threshold is based at least in part on transmission of the energy signal.

Aspect 23: The method of aspect 22, wherein the energy signal is a CW signal.

Aspect 24: The method of any of aspects 21 through 23, wherein the energy threshold is based at least in part on an energy level of the second wireless device, a power level of the second wireless device, a voltage level of the second wireless device, or any combination thereof.

Aspect 25: The method of any of aspects 16 through 24, wherein an initial signal including the parameters further includes an energy signal based at least in part on the second wireless device being an energy harvesting device.

Aspect 26: The method of any of aspects 16 through 25, wherein the parameters include an indication of a duration between transmission of the parameters and transmission of the positioning signal, a frequency shift associated with the backscattered positioning signal, a phase shift sequence associated with the backscattered positioning signal, a backscattering function to be applied to the positioning signal, a type of the backscattering function, a backscatter duration, or any combination thereof.

Aspect 27: The method of any of aspects 16 through 26, wherein the parameters are transmitted to the second wireless device, the method further comprising: transmitting, to the second wireless device, the positioning signal.

Aspect 28: The method of any of aspects 16 through 26, wherein the parameters are received from a third wireless device, the method further comprising: transmitting, to the third wireless device, an indication of the position of the second wireless device.

Aspect 29: An apparatus for wireless communications at a wireless device, comprising a processor; memory coupled with the processor; and instructions stored in the memory and executable by the processor to cause the apparatus to perform a method of any of aspects 1 through 15.

Aspect 30: An apparatus for wireless communications at a wireless device, comprising at least one means for performing a method of any of aspects 1 through 15.

Aspect 31: A non-transitory computer-readable medium storing code for wireless communications at a wireless device, the code comprising instructions executable by a processor to perform a method of any of aspects 1 through 15.

Aspect 32: An apparatus for wireless communications at a first wireless device, comprising a processor; memory coupled with the processor; and instructions stored in the memory and executable by the processor to cause the apparatus to perform a method of any of aspects 16 through 28.

Aspect 33: An apparatus for wireless communications at a first wireless device, comprising at least one means for performing a method of any of aspects 16 through 28.

Aspect 34: A non-transitory computer-readable medium storing code for wireless communications at a first wireless device, the code comprising instructions executable by a processor to perform a method of any of aspects 16 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a wireless device, comprising:
   a processor;
   one or more memories coupled with the processor; and
   instructions stored in the one or more memories and executable by the processor to cause the apparatus to:
      receive parameters associated with backscattering a positioning signal, the parameters including an identifier associated with the wireless device and an indication of a time offset associated with transmission of a backscattered positioning signal;
      receive the positioning signal based at least in part on the identifier;
      initiate a timer following receipt of a reference symbol; and
      transmit the backscattered positioning signal based at least in part on applying a backscattering function to the positioning signal in accordance with the time offset and an expiration of the timer, and a duration of the timer is based at least in part on the time offset.

2. The apparatus of claim 1, wherein the reference symbol is a last symbol of an initial signal including the parameters or is based at least in part on a type of the time offset.

3. The apparatus of claim 1, wherein the parameters indicate a first type of time offset from a plurality of types of time offsets, and the instructions are further executable by the processor to cause the apparatus to:
   receive a control signal indicating the plurality of types of time offsets, wherein each type of time offset of the plurality of types of time offsets is associated with a duration of the timer, a reference symbol, or both, and wherein the time offset is based at least in part on the indication of the first type of time offset.

4. The apparatus of claim 3, wherein the duration of the timer, the first type of time offset, or both, are based at least in part on a capability of the wireless device.

5. The apparatus of claim 1, wherein the parameters indicate a plurality of time offsets associated with a plurality of wireless devices, and the plurality of time offsets comprises the time offset, and wherein the plurality of wireless devices comprises the wireless device.

6. The apparatus of claim 1, wherein the parameters comprise an indication of a type of the backscattering function, and the instructions are further executable by the processor to cause the apparatus to:
   calculate the time offset based at least in part on a first set of backscattering parameters and a backscatter duration, wherein the first set of backscattering parameters is based at least in part on the type of the backscattering function.

7. The apparatus of claim 6, wherein the instructions are further executable by the processor to cause the apparatus to:
receive a control signal indicating a plurality of sets of backscattering parameters associated with calculating the time offset, wherein each set of backscattering parameters is associated with a type of backscattering function, and wherein the plurality of sets of backscattering parameters comprises the first set of backscattering parameters.

8. The apparatus of claim 6, wherein the first set of backscattering parameters are based at least in part on the identifier associated with the wireless device.

9. The apparatus of claim 1, wherein the parameters indicate an energy threshold, and the instructions are further executable by the processor to cause the apparatus to:
transmit an acknowledgment message indicating initiation of a positioning session based at least in part on the wireless device satisfying the energy threshold; and
initiate a timer as part of the positioning session following transmission of the acknowledgment message, wherein transmission of the backscattered positioning signal is based at least in part on expiration of the timer, and wherein a duration of the timer is based at least in part on the time offset.

10. The apparatus of claim 9, wherein the instructions are further executable by the processor to cause the apparatus to:
receive an energy signal based at least in part on reception of an initial signal including the parameters; and
harvesting energy from the energy signal, wherein the wireless device satisfy the energy threshold is based at least in part on harvesting energy from the energy signal.

11. The apparatus of claim 10, wherein the energy signal is a continuous wave signal.

12. The apparatus of claim 9, wherein the energy threshold is based at least in part on an energy level of the wireless device, a power level of the wireless device, a voltage level of the wireless device, or any combination thereof.

13. The apparatus of claim 1, wherein an initial signal including the parameters further includes an energy signal based at least in part on the wireless device being an energy harvesting device.

14. The apparatus of claim 1, wherein the parameters include an indication of a duration between reception of the parameters and reception of the positioning signal, a frequency shift associated with the backscattered positioning signal, a phase shift sequence associated with the backscattered positioning signal, the backscattering function, a type of the backscattering function, a backscatter duration, an energy threshold, or any combination thereof.

15. An apparatus for wireless communications at a first wireless device, comprising:
a processor;
one or more memories coupled with the processor; and
instructions stored in the one or more memories and executable by the processor to cause the apparatus to:
communicate parameters associated with a second wireless device backscattering a positioning signal, the parameters including an energy threshold, an identifier associated with the second wireless device, and an indication of a time offset associated with transmission of a backscattered positioning signal;
receive an acknowledgment message indicating an initiation of a positioning session based at least in part on the second wireless device satisfying the energy threshold;
receive, from the second wireless device and based at least in part on the acknowledgement message, the backscattered positioning signal; and
calculate a position of the second wireless device based at least in part on the time offset and a time of reception of the backscattered positioning signal.

16. The apparatus of claim 15, wherein the parameters indicate a first type of time offset from a plurality of types of time offsets, and the instructions are further executable by the processor to cause the apparatus to:
transmit a control signal indicating the plurality of types of time offsets, wherein each type of time offset of the plurality of types of time offsets is associated with a duration of a timer, a reference symbol, or both, and wherein the time offset is based at least in part on the indication of the first type of time offset.

17. The apparatus of claim 15, wherein the parameters indicate a plurality of time offsets associated with a plurality of wireless devices, and wherein the plurality of time offsets comprises the time offset, and wherein the plurality of wireless devices comprises the second wireless device.

18. The apparatus of claim 15, wherein the parameters comprise an indication of a first type of backscattering function associated with a first set of backscattering parameters to be applied by the second wireless device, and the instructions are further executable by the processor to cause the apparatus to:
transmit a control signal indicating a plurality of sets of backscattering parameters associated with the second wireless device calculating the time offset, wherein each set of backscattering parameters is associated with a type of backscattering function, and wherein the time offset is based at least in part on the first set of backscattering parameters from the plurality of sets of backscattering parameters.

19. The apparatus of claim 18, wherein the first set of backscattering parameters are based at least in part on the identifier associated with the second wireless device.

20. The apparatus of claim 15, wherein the instructions are further executable by the processor to cause the apparatus to:
transmit an energy signal based at least in part on transmission of an initial signal including the parameters, wherein satisfaction of the energy threshold is based at least in part on transmission of the energy signal.

21. The apparatus of claim 20, wherein the energy signal is a continuous wave signal.

22. The apparatus of claim 15, wherein the energy threshold is based at least in part on an energy level of the second wireless device, a power level of the second wireless device, a voltage level of the second wireless device, or any combination thereof.

23. The apparatus of claim 15, wherein an initial signal including the parameters further includes an energy signal based at least in part on the second wireless device being an energy harvesting device.

24. The apparatus of claim 15, wherein the parameters include an indication of a duration between transmission of the parameters and transmission of the positioning signal, a frequency shift associated with the backscattered positioning signal, a phase shift sequence associated with the backscattered positioning signal, a backscattering function to be applied to the positioning signal, a type of the backscattering function, a backscatter duration, or any combination thereof.

25. The apparatus of claim 15, wherein the parameters are transmitted to the second wireless device, and the instructions are further executable by the processor to cause the apparatus to:
    transmit, to the second wireless device, the positioning signal.

26. The apparatus of claim 15, wherein the parameters are received from a third wireless device, and the instructions are further executable by the processor to cause the apparatus to:
    transmit, to the third wireless device, an indication of the position of the second wireless device.

27. A method for wireless communications at a wireless device, comprising:
    receiving parameters associated with backscattering a positioning signal, the parameters including an identifier associated with the wireless device and an indication of a time offset associated with transmission of a backscattered positioning signal;
    receiving the positioning signal based at least in part on the identifier;
    initiating a timer following receipt of a reference symbol; and
    transmitting the backscattered positioning signal based at least in part on applying a backscattering function to the positioning signal in accordance with the time offset and an expiration of the timer, and a duration of the timer is based at least in part on the time offset.

28. A method for wireless communications at a first wireless device, comprising:
    communicating parameters associated with a second wireless device backscattering a positioning signal, the parameters including an energy threshold, an identifier associated with the second wireless device, and an indication of a time offset associated with transmission of a backscattered positioning signal;
    receive an acknowledgment message indicating an initiation of a positioning session based at least in part on the second wireless device satisfying the energy threshold;
    receiving, from the second wireless device and based at least in part on the acknowledgement message, the backscattered positioning signal; and
    calculating a position of the second wireless device based at least in part on the time offset and a time of reception of the backscattered positioning signal.

* * * * *